US008188999B2

(12) United States Patent
Dorbie

(10) Patent No.: US 8,188,999 B2
(45) Date of Patent: May 29, 2012

(54) METHOD AND APPARATUS FOR ORGANIZING OBJECT GEOMETRY FOR SPATIAL AND MEMORY COHERENCY AND OPTIMAL RENDERING

(75) Inventor: Angus MacDonald Dorbie, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1013 days.

(21) Appl. No.: 12/140,770

(22) Filed: Jun. 17, 2008

(65) Prior Publication Data

US 2009/0309876 A1    Dec. 17, 2009

(51) Int. Cl.
*G06T 17/00* (2006.01)
*G06T 15/30* (2011.01)
*G06T 17/20* (2006.01)

(52) U.S. Cl. .......................... 345/420; 345/423
(58) Field of Classification Search .................. None
See application file for complete search history.

(56) References Cited

U.S. PATENT DOCUMENTS

| 5,553,206 | A  | * | 9/1996  | Meshkat ....................... 345/423 |
| 5,896,139 | A  | * | 4/1999  | Strauss ........................ 345/440 |
| 6,108,006 | A  | * | 8/2000  | Hoppe ......................... 345/423 |
| 6,256,038 | B1 | * | 7/2001  | Krishnamurthy ............ 345/419 |
| 6,429,865 | B1 | * | 8/2002  | Marshall ...................... 345/420 |
| 6,469,701 | B1 | * | 10/2002 | Gumhold ..................... 345/419 |
| 6,476,816 | B1 | * | 11/2002 | Deming et al. .............. 345/502 |
| 6,518,963 | B1 | * | 2/2003  | Waupotitsch et al. ....... 345/419 |
| 7,190,362 | B1 | * | 3/2007  | Baker et al. .................. 345/419 |
| 7,245,299 | B2 | * | 7/2007  | Sfarti ........................... 345/423 |
| 7,436,405 | B2 | * | 10/2008 | Losasso Petterson et al. .......................... 345/428 |

OTHER PUBLICATIONS

Xiang, X. et al., Fast and Effective Stripification of Polygonal Surface Models, 1999 Symposium on Interactive 3D Graphics Atlanta GA USA, ACM 1999 (month unknown).*
El-Sana, J. et al., Efficiently Computing and Updating Triangle Strips for Real-Time Rendering, Computer-Aided Design, vol. 32, Issue 13 pp. 753-772; Elsevier, Nov. 2000.*

* cited by examiner

*Primary Examiner* — Kee M Tung
*Assistant Examiner* — Carlos Perromat
(74) *Attorney, Agent, or Firm* — James T. Hagler

(57) ABSTRACT

Methods and computing devices enable the generation of contiguous triangle patches for use in generating triangle strips for processing in a computer graphics engine. A seed triangle is selected and a patch of contiguous triangles is formed by incrementally adding adjacent triangles to the patch at equal steps from the seed triangle until a limit is reached or no more triangles can be added to the patch. Triangles whose vertices are already included in the patch are also added to the patch. If no more triangles can be added to the patch before the vertex limit is reached, a new seed triangle may be selected and another patch generated until the vertex limit is reached. Forming patches of contiguous triangles before generating triangle strips improves memory utilization can speed the processing of computer graphic objects.

20 Claims, 27 Drawing Sheets

| Index | V1 | V2 | V3 | V4 | V5 | V6 | V7 | V8 |
|---|---|---|---|---|---|---|---|---|
| Coordinates x, y, z | $x_1, y_1, z_1$ | $x_2, y_2, z_2$ | $x_3, y_3, z_3$ | $x_4, y_4, z_4$ | $x_5, y_5, z_5$ | $x_6, y_6, z_6$ | $x_7, y_7, z_7$ | $x_8, y_8, z_8$ |
| Color r, g, b | $r_1, g_1, b_1$ | $r_2, g_2, b_2$ | $r_3, g_3, b_3$ | $r_4, g_4, b_4$ | $r_5, g_5, b_5$ | $r_6, g_6, b_6$ | $r_7, g_7, b_7$ | $r_8, g_8, b_8$ |
| Surface Normal $n_x, n_y, n_z$ | $nx_1, ny_1, nz_1$ | $nx_2, ny_2, nz_2$ | $nx_3, ny_3, nz_3$ | $nx_4, ny_4, nz_4$ | $nx_5, ny_5, nz_5$ | $nx_6, ny_6, nz_6$ | $nx_7, ny_7, nz_7$ | $nx_8, ny_8, nz_8$ |
| Texture Coordinate s, t | $s_1, t_1$ | $s_2, t_2$ | $s_3, t_3$ | $s_4, t_4$ | $s_5, t_5$ | $s_6, t_6$ | $s_7, t_7$ | $s_8, t_8$ |
| Other a, b, c | $a_1, b_1, c_1$ | $a_2, b_2, c_2$ | $a_3, b_3, c_3$ | $a_4, b_4, c_4$ | $a_5, b_5, c_5$ | $a_6, b_6, c_6$ | $a_7, b_7, c_7$ | $a_8, b_8, c_8$ |

FIG. 13

```
void Qsplit::DescendAddUnused(triangle *tri, int level, int usedval)
{
        int i, misses, vpos;
        triangle *next_tri;

if(tri && ( tri->used == usedval || false == tri->used) )
        {
                if(level == 0)
                {
                        if(false == tri->used)
                        {
                                if(m_indexbuffer->check(tri->m_indices[0], vpos))
                                {
                                        misses = 0;
                                }
                                else
                                {
                                        misses = 1;
                                }
                                if(!m_indexbuffer->check(tri->m_indices[1], vpos))
                                {
                                        misses ++;
                                }
                                if(!m_indexbuffer->check(tri->m_indices[2], vpos))
                                {
                                        misses ++;
                                } if(AddTri(tri, misses, usedval))
                                {
                                        m_indexbuffer->fetch(tri->m_indices[0]);
                                        m_indexbuffer->fetch(tri->m_indices[1]);
                                        m_indexbuffer->fetch(tri->m_indices[2]);
                                }
                        }
                        return;
                }
                for(i = 0; i< tri->m_acount; i++)
                {
                        next_tri = tri->get_numbered_neighbor(i);

if(next_tri)
                        {
                                DescendAddUnused( next_tri, level-1, usedval);
                        }
                }
        }
}
```

FIG. 40

METHOD AND APPARATUS FOR ORGANIZING OBJECT GEOMETRY FOR SPATIAL AND MEMORY COHERENCY AND OPTIMAL RENDERING

FIELD OF THE INVENTION

The present invention relates generally to computer graphics technologies, and more particularly to methods and apparatus for optimizing rendering of computer graphics.

BACKGROUND

In computer generated graphics, practically every object viewed in a 3-D graphics screen is modeled as a large number of triangle polygons. Graphic processing of polygons, and in particular triangles, simplifies the complex processes of object modeling, image transformation and image rendering.

Using a sufficient number of triangles any shape and surface can be approximated. For example, FIG. 1 illustrates an object (a rabbit 10) to be modeled in a computer graphics scene. In order to model this object so that it can be manipulated and rendered using computer graphics software and hardware, a graphics developer will transform the model into a mesh model 12 of triangle polygons 14 as illustrated in FIG. 2. Each triangle has three vertices, so adjacent triangles have a common side and two common vertices. Graphics hardware and software then digests such triangle polygons in a number of mathematically complex transformations in order to generate pixels for display on the graphic screen. Each vertex in each triangle is transformed into pixels which are eventually written into the frame buffer by what is known as a graphics pipeline.

Since the transformation of polygon models into pixels involves extensive mathematical transformations, hardware and software developers are motivated to package and process the triangles in the most efficient manner to minimize the amount of processing that needs to be accomplished. While some methods have been developed, they suffer from a number of deficiencies and may not yield efficient processing of modeled objects in all hardware or software implementations.

SUMMARY

Various embodiments provide methods for selecting patches of contiguous polygons for processing. By selecting patches of contiguous triangles, triangle strips can be formed in a computer graphics processing application which maximize reuse of processed vertices, optimize use of cache memory, minimize the number of triangle strips required in processing an object and provide other processing benefits. Before triangles are converted into triangle strips, a seed triangle is selected and a patch is generated from the seed triangle by incrementally adding adjacent triangles to the patch which are of equal connective distance from the seed. Vertex indices or a running total of unique vertices may be kept and used as a limiter. Adjacent triangles are incrementally added to the edges of the patch until the limit is reached or no more triangles can be added to the patch. If no more triangles can be added to the patch before the vertex limit is reached and the object includes additional triangles, a new seed triangle can be selected and the process continued until the vertex limit is reached. Once the vertex limit is reached, any convex triangles (i.e., triangles whose three vertices are resident within the patch) are added to the patch. The generated patch of contiguous triangles can then be processed in a triangle strip generator. Triangle strips produced from multiple patches may be combined into a single graphics engine draw call through the use of degenerate stitching.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIG. 13 is a data structure diagram of a data structure suitable for indexing triangle vertex coordinates for use with the various embodiments.

FIG. 40 is an example of software source code for accomplishing the triangle dilation process according to an embodiment.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the terms "exemplary" is used to mean "serving as an example, instance, or illustration." Any implementation described herein as "exemplary" is not necessarily to be construed as preferred or advantageous over other implementations.

In this description, the term "triangle" is used to refer to a polygon used to model objects for using in computer graphics. In this description, the terms "triangle patch" and "patch" are used to refer to a group of contiguous triangles (i.e., triangles connected by adjoining sides). While the preferred embodiment is suitable for triangles polygon computer graphic models, the various embodiments may also be applied and are equally useful with computer graphics processing which models objects as a plurality of non-triangle polygons. Thus, the term "triangle" as used herein is not intended to limit the scope of the disclosure and the claims to triangle polygons.

Figure 38:
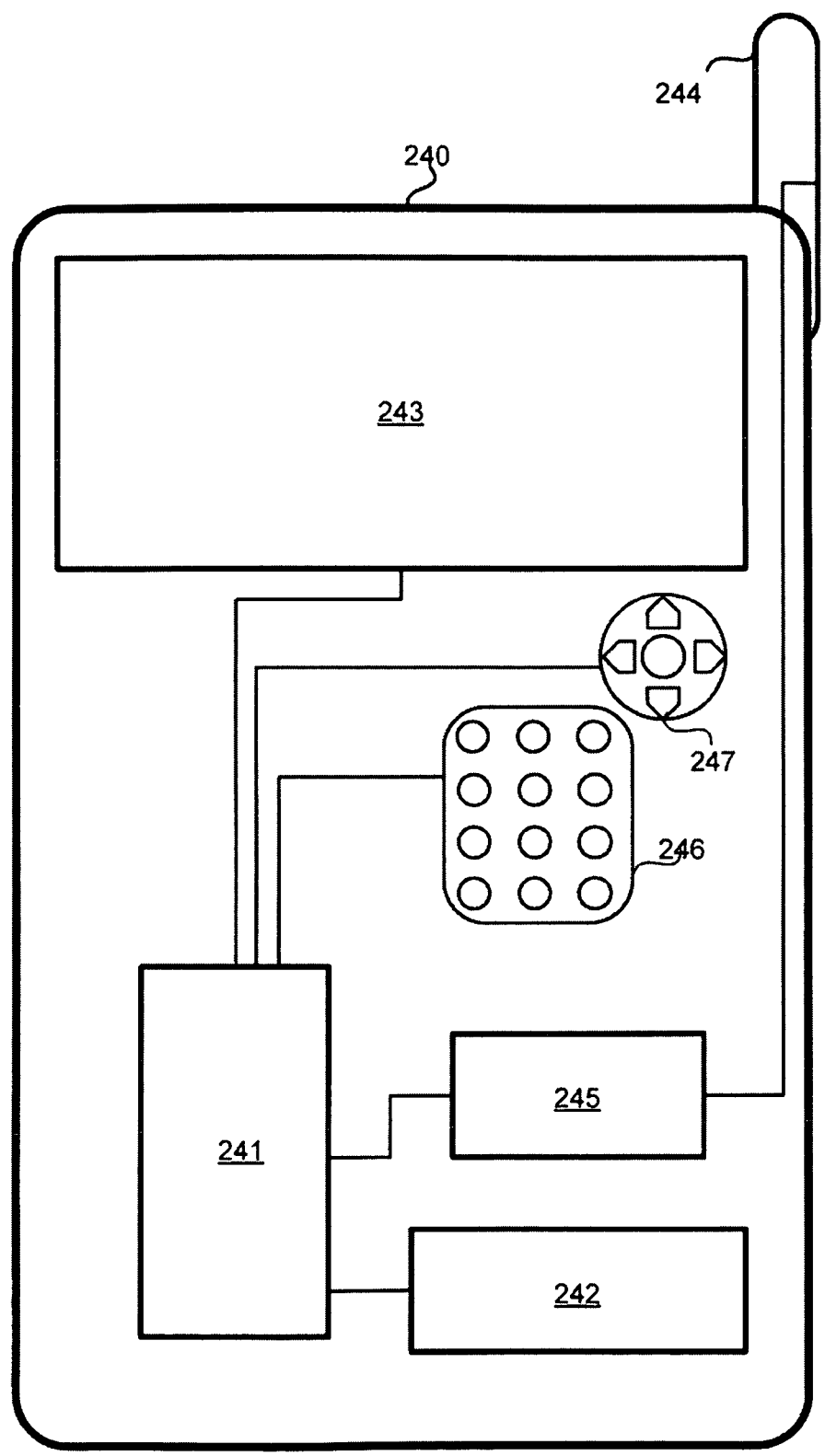
FIG. 38 is a component block diagram of a mobile computing device suitable for use with the various embodiments.

As used herein the terms "computer" and "computer system" are intended to encompass any form of programmable computer as may exist or will be developed in the future, including, for example, personal computers, laptop computers, mobile computing devices (e.g., cellular telephones, personal data assistants (PDA), palm top computers, and multifunction mobile devices), main frame computers, servers, and integrated computing systems. A computer typically includes a software programmable processor coupled to a memory circuit, but may further include the components described below with reference to FIGS. 38 and 39.

The processing of objects modeled for computer graphics in a variety of applications, such as gaming applications, involves many complex mathematical transformations of a large number of triangle polygons used to model objects. A variety of methods have been introduced for selecting the order in which particular triangles are processed (i.e., converted into pixels). If triangles are processed in strips of adjacent triangles, the number of mathematical transformations that must be performed is reduced as each subsequent triangle in a triangle strip requires processing of at most a single additional vertex. Thus, methods have been introduced for selecting triangles for processing in order to process them in triangle strips. Such methods typically involve selecting the next adjacent triangle until no more adjacent triangles remain to be processed.

Known methods for processing triangles in triangle strips may not process triangles in an optimum fashion. Each triangle in a building triangle strip has up to two directional options, except the first triangle in a strip which has up to three directional options. Each direction choice at each triangle may have different costs on different platforms. Further, if adjacent triangles are not properly selected, some triangles in an object may be isolated, requiring new triangle paths to be established, or may not be efficiently processed (e.g., requiring the generation of degenerate triangles in order to process the triangle). If triangle paths are selected without regard to the overall object configuration, such paths may isolate portions of the object requiring additional triangle strips, redundant processing of many triangle vertices and inefficient use of cache memory. As a result, a cost will be paid in terms of additional processing time because triangle strips were not formed in an efficient manner.

To overcome these disadvantages, the various embodiments provide methods for identifying patches of contiguous triangles within modeled objects prior to the formation of triangle strips in order to identify a portion of the object that can be processed without creating isolated regions. The methods and apparatus dilate a patch of contiguous triangles within a mesh of triangles at equal traversal depths from a seed triangle until a maximum number of vertices are encompassed within the patch. The limit on the number of vertices may be set based upon the size of the vertex cache available and/or other limitations of the graphics processing hardware. A seed triangle is selected on the modeled object, such as by using heuristic criteria. Adjacent triangles which are of equal connected distance from the seed triangle are added to the patch in steps until the vertex limit is reached. Thus, the seed triangle is incrementally dilated into a patch of contiguous triangles. Triangles can be added to the patch using a variety of algorithms, including for example a moving wave front method or a recursive traversal path method in which adjacent triangle paths are followed from the seed triangle down to all contiguous triangles to a certain traversal depth. The wave front is expanded or the traversal depths is increased incrementally in dilation steps as the patch grows. A running total of the unique vertices included in the patch is kept and can be used to determine when a limit is reached. New triangles are added to the patch after each traversal step and the number of unique indices (i.e., indices which have not already been indexed in the formation of the patch) in the added triangles is added to the index total. Once the vertex limit is reached (i.e. the total equals the vertex limit), convex triangles, which are triangles whose three vertices are all resident within the patch, are also added to the patch. If a dilation runs out of candidate triangles to add before the vertex limit is reached, a new seed triangle may be selected and the dilation process continued from the new seed to form a second triangle patch until the vertex limit is reached. By forming patches of contiguous triangles in this manner, each vertex can be processed just once when the patch of triangles is converted to triangle strips and processed by the graphics pipeline.

Once a patch has been generated, various methods may be used to create triangle strips for processing. An example of suitable methods are disclosed and claimed in U.S. patent application Ser. No. 12/140,720 entitled "Method And Apparatus For Optimizing Triangles Into Triangle Strips According To A Variety Of Criteria" filed concurrently herewith, the entire contents of which are hereby incorporated by reference. The methods disclosed in that patent application employ game tree analyses to look ahead and evaluate alternative paths (i.e., sequences of adjacent triangle selections) that may be implemented in forming triangle strips. Each alternative path through a complex of triangles is determined to a preset depth (i.e., a preset number of steps down a game tree) or until no further triangles can be evaluated, such as when a dead end is reached or when all triangles in an object have been evaluated. At that point a score is determined for the path according to the performance-related criterion or criteria against which the triangle strips are being optimized. The process continues evaluating each alternative path branching from triangles within each path in order to obtain scores for all path options extending from the first triangle in the strip. Once all of the alternative paths extending from the root triangle have been evaluated, the alternative path selection (i.e., the next triangle choice for processing) associated with the highest evaluated path score is selected and the next triangle along that path selected for graphic processing. In this manner, triangle paths leading to dead ends or isolated triangles may be avoided. The performance-related criteria may include one or more of use of vertex cache, number of vertices transformed, use of the limited size cache, triangle swaps incurred (degenerate triangles issued), cache misses, number of isolate triangles remaining, etc. By combining the patch formation processes of the current application with the look-ahead methods of the Ser. No. 12/140,720 application, efficient triangle strips can be generated which avoid isolating portions of the modeled object.

The process for generating patches of contiguous triangles may be repeated using other seeds selected based on heuristic criteria (e.g., separation distance from formed patches in order to ensure the seeds are isolated) to form additional patches for processing until all triangles have been exhausted. Triangles strips produced from multiple patches formed in this matter may then be combined into a single triangle draw for graphic processing by using degenerate triangle stitching methods. The relatively small number of entities that share a boundary between patches must be transformed multiple times in order to stitch the patches together. However, this additional processing is a low cost compared to transforming many vertices multiple times, over subscribing the vertex pool, or processing triangles in a manner which results in inefficient use of cache memory.

Figure 1:
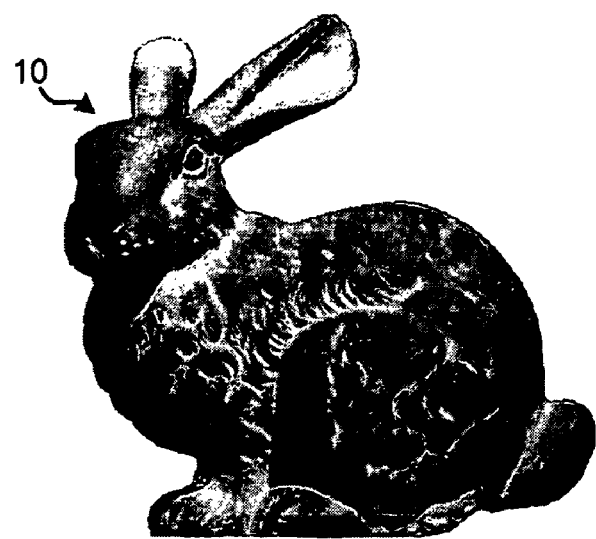
FIG. 1 is an image of an object to be modeled for manipulation in a computer graphics system.
Figure 2:
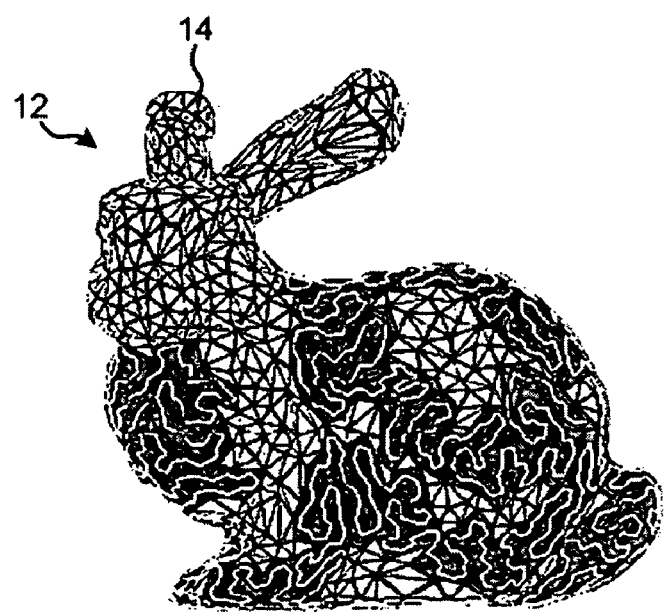
FIG. 2 is an image of the object illustrated in FIG. 1 modeled as a plurality of triangle polygons suitable for manipulation in a computer graphics system.
Figure 3:
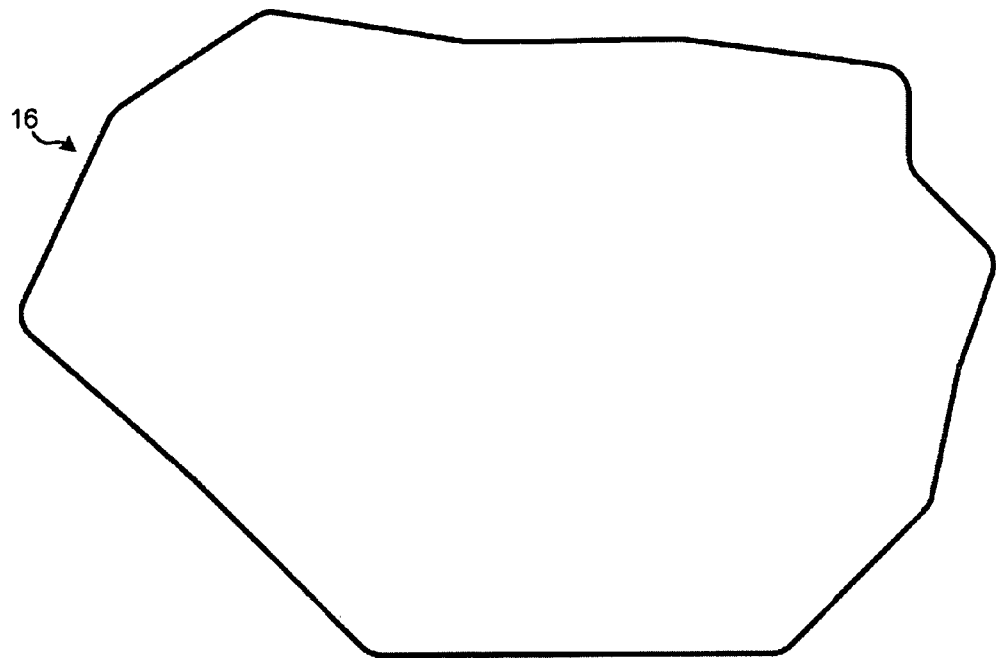
FIG. 3 is an image of a simple object to be modeled in a computer graphics system.
Figure 4:
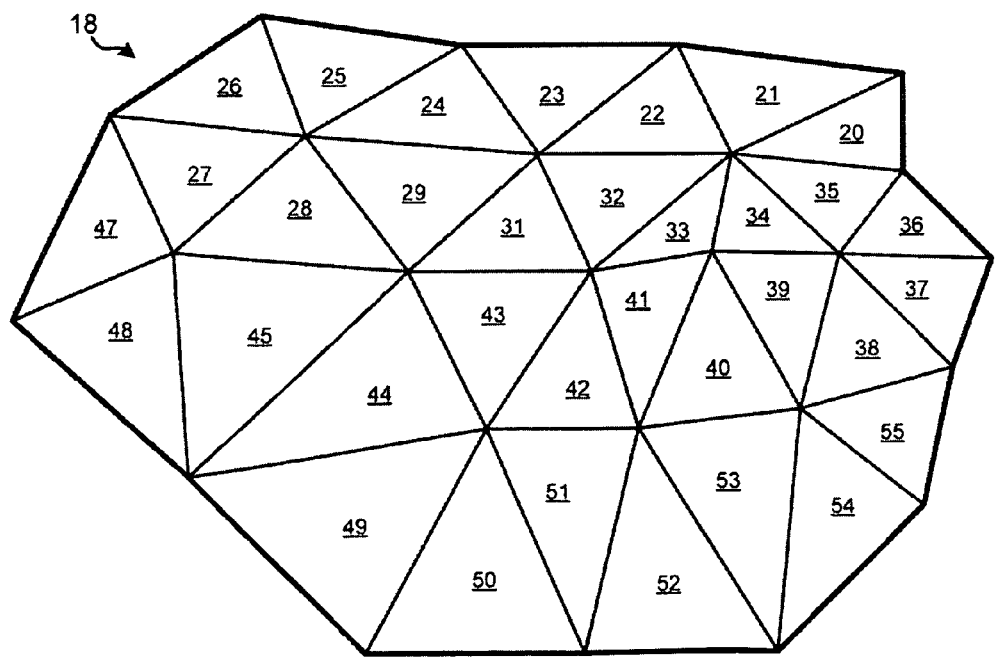
FIG. 4 shows the simple object of FIG. 3 modeled as a plurality of triangle polygons.

To better explain the embodiments, references will be made to processing of the graphic object 16 illustrated in FIG. 3. This irregular shaped object could be a rock, a piece of metal or some other element within a graphic scene in graphic application, such as a game application for example. In order for a computer graphic system to process this modeled object 16, the application developer will model the object's surface as a network of triangles 20-55 as illustrated in FIG. 4. By using a sufficient number of triangles, the shape and surface contours of the object 16 can be approximated by a modeled object 18 that can be easily manipulated by the computer graphics system to render 2-D and 3-D images.

Figure 5:
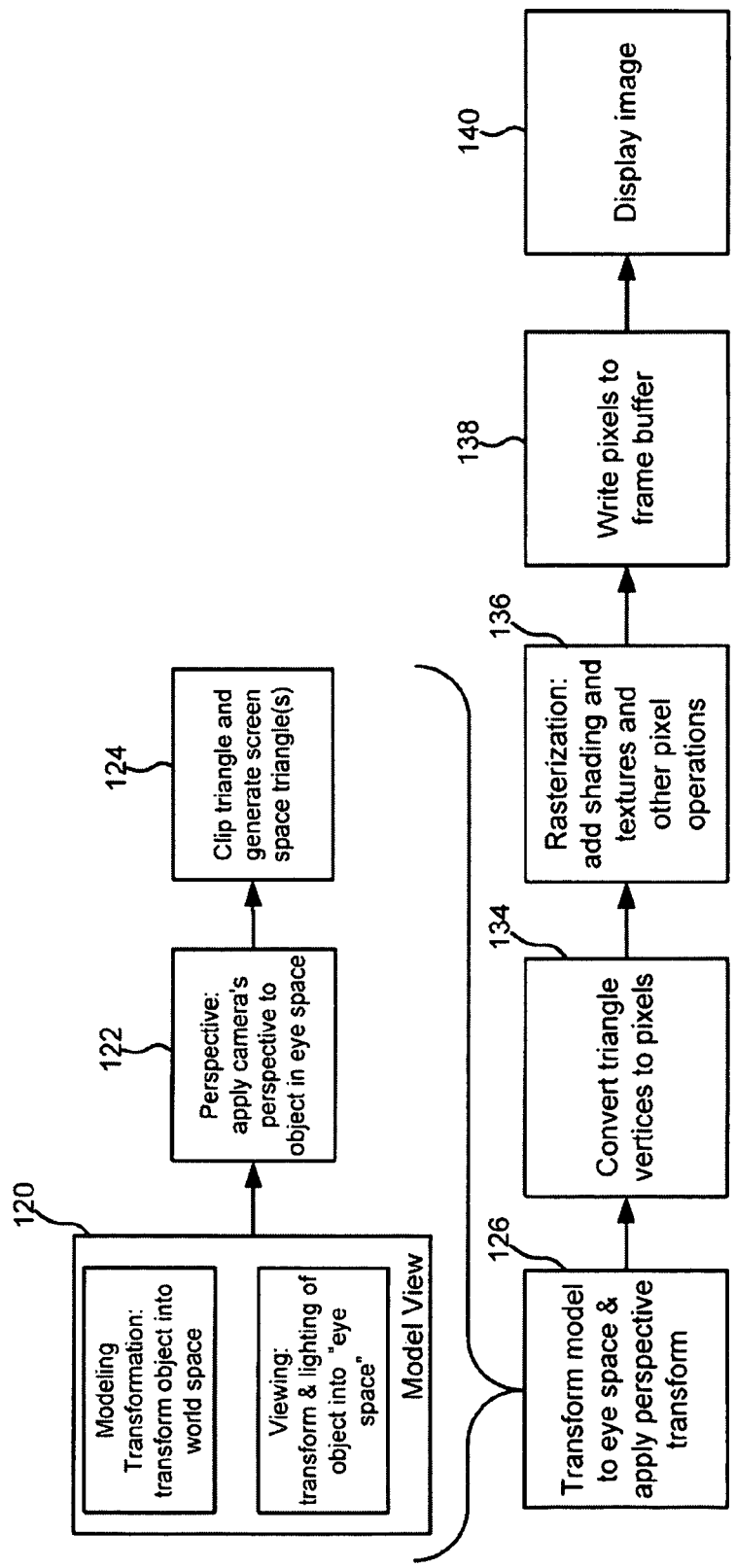
FIG. 5 is a simplified process flow diagram of a typical graphics pipeline.

Graphic processing within computing devices is typically performed in a graphics pipeline. A functional block diagram of a computer graphics pipeline and the steps involved in transforming and converting triangles 20-55 of the modeled object 18 are illustrated in FIG. 5. As a first step, the graphics pipeline transforms a modeled object 18 in model space into "eye space," which is the shape and location of the object when viewed from the perspective of the graphics screen, and applies perspective to the modeled object 18, step 126. This step 126 is sometimes referred to as "transformation" and may be accomplished in hardware or software or a combination of both. As part of the transformation process, the graphics software may first transform the object within "model space" to reflect its position and movement within the coordinates of the game (or other application), and then transform the object into "eye space," together step 120. This processing positions the modeled object 18 within a particular image frame according to what is happening to the object in the game application (i.e., within model space), and then transforms this modeled object 18 to reflect the viewing angle that one would have when looking through the window of the computer graphics screen (i.e., within eye space). With the object transformed into eye space, the computer graphics system may then adjust the apparent shape of the modeled object 18 in order to apply 3-D perspective appropriate for the modeled object's location within eye space, step 122. In applying perspective, portions of the modeled object 18 that are closer to the image screen are made larger while portions of the object further away are made smaller. Finally, the image is clipped to include only that part of the space which would be viewed through the graphics screen, step 124. Thus, the process of transformation selects a subset of triangles within modeled objects that would be viewed from the perspective of the computer graphics screen, and ignores triangles that would not be visible (e.g., hidden by other objects or by the contours of the object itself) or lie outside the screen space.

When the modeled object 18 triangles 20-55 have been transformed into the proper eye space perspective and clipped to the size of the screen, information related to the vertices are used to generate pixels for the display, step 134. In this process, coordinate values associated with each vertex are used to calculate the position and image information within one or more display pixels. As discussed in further detail below with reference to FIG. 13, each vertex includes a large number of coordinate values which specify the location, color, surface normal, textures and shading, as well as other characteristics which are useful for generating display pixels. The computations required to convert triangle vertices into pixels are complex and involve large amounts of data. Consequently, significant performance improvements can be achieved by organizing the conversion of triangles so that the number of vertex-to-pixel conversions is minimized. In some architectures performance can also be improved by maximizing uses of cache memory or working within a limited cache size. The various embodiments involve operations which occur after transformation, step 126, and before conversion of triangle vertices into pixels, step 134.

After pixels are generated, shading and textures are applied to the pixels as well as other operations associated with the graphics generation, step 136. Once pixels have been rasterized, they are written to the image frame buffer, step 138, from which they are immediately sent to the display in order to display the image, step 140.

As discussed above, a commonly used method for minimizing the number of vertex-to-pixel conversions is to process triangles in a selected order so that the results for two shared vertices of adjoining triangle vertices can be leveraged. Thus, in most graphics processing systems triangles are typically converted in contiguous strips such as illustrated in FIGS. 6 and 7.

Figure 6:
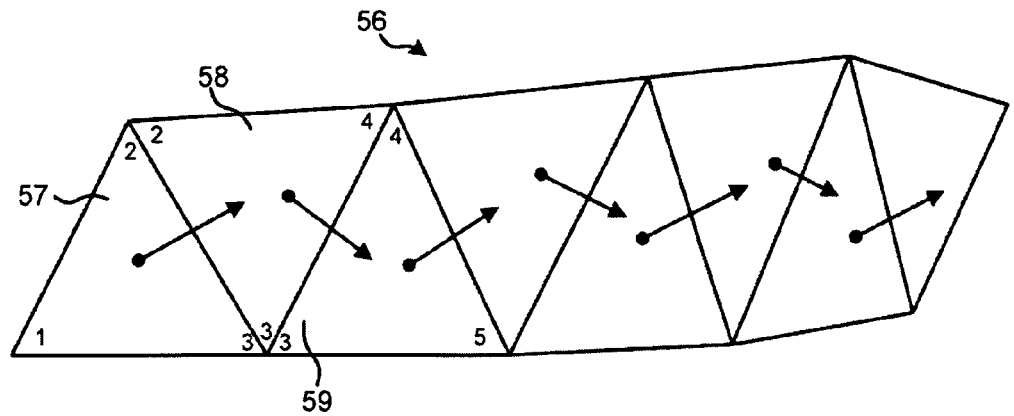
FIGS. 6-8 are illustrations of a simple triangle strip illustrating processing of triangles in a graphics system.
Figure 7:
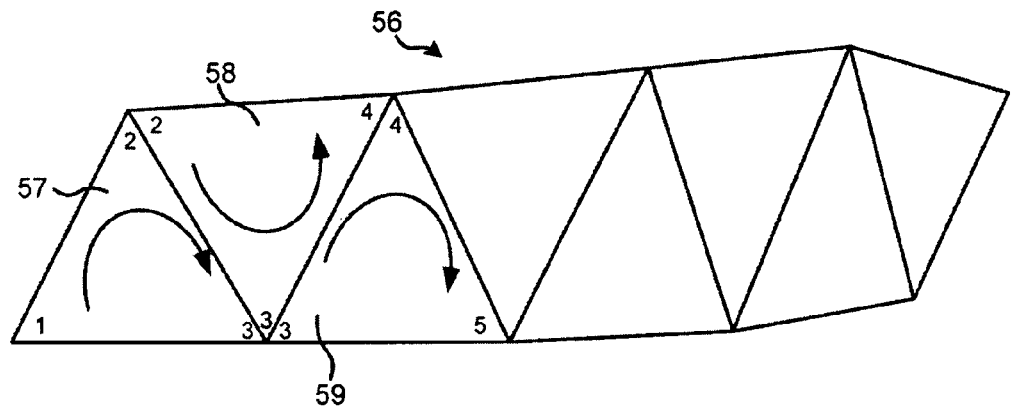

Referring to FIG. 6 it can be seen that the conversion of triangle vertices in a triangle strip reduces the number of vertex conversions required. For example, if the triangles 57-59 are processed in the order indicated by the arrows to yield a triangle strip 56, conversion results from shared vertices can be reused so that fewer vertex conversions are required. This is illustrated by considering the process of first converting triangle 57 followed by converting triangle 58. The first triangle 57 includes three vertices 1, 2, and 3 which must be converted. Since it is the first triangle in the triangle strip 56, there can be no saving on the conversion of its vertices. However, when converting the second triangle 58, two of the vertices, specifically, vertex 2 and vertex 3, are the same as converted in triangle 57 and therefore do not need to be converted a second time. Thus, the conversion of the second triangle 58 only involves the conversion of one more vertex 4. Similarly, processing the next triangle 59 only involves the conversion of vertex 5. The processing of adjacent triangles can continue through the rest of the triangle strip 56 in a similar manner. As this figure illustrates, while the first triangle 57 requires the conversion of three vertices into pixels, subsequent triangles only require at most a single vertex conversion each.

The process of selecting triangles for conversion in order to form triangle strips 56 may also consider the vertex order in which the vertices are processed, sometimes referred to as the "winding order" of the vertex conversions. For example, in the first triangle 57, the indicated order of vertex conversion shown by the curved arrow is vertex 1 followed by vertex 2 followed by vertex 3. The second triangle 58 is converted in a similar order starting with vertex 2 continuing to vertex 3 and ending with vertex 4. Similarly, the next triangle 59 proceeds from vertex 3 to vertex 4 and finishing with vertex 5. By selecting triangles so that the vertex conversion winding order is properly aligned, conversion results from the two previous conversions can be maintained in buffer memory (e.g., within the resident memory of the digital signal processor (DSP) performing the conversion) in the order they were processed in the preceding triangle, thus providing saving in memory accessing and other processing.

Figure 8:
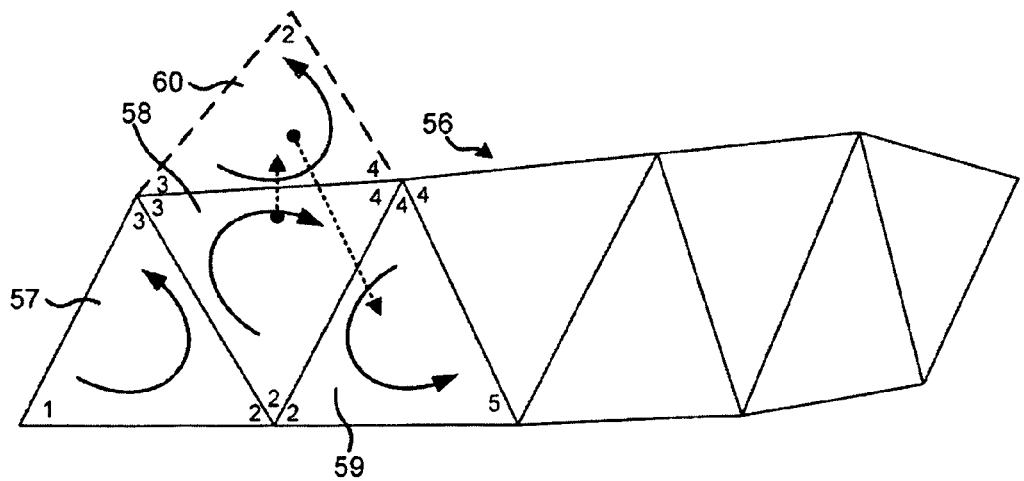

Some graphic pipeline implementations allow triangle vertices to be processed in any order. However, such flexibility comes at the price of processing speed and increased buffer memory requirements. Other graphic pipeline implements can only handle triangles in winding order, and thus must perform additional processing to switch the winding order when the next selected triangle must be processed in a different order. This additional processing is illustrated in FIG. 8. To switch the winding order, an imaginary or "degenerate" triangle 60 may be used to swap the order in which vertices are processed in the adjoining triangles. In the example illustrated in FIG. 8, the processing winding order of triangle 58 is incompatible with the next triangle 59 because the last two vertices processed in triangle 58 were 3 and 4, while the adjoining vertices in triangle 59 are 4 and 2. In order to swap the winding order, the process can create a degenerate triangle 60 which is a triangle that does not add to the number of vertices. By reusing vertex 2, the degenerate triangles 60 is processed so that the last two processed vertices are 4 and 2, matching the order in which vertices must be processed in triangle 59. Swapping triangles by processing degenerate triangles comes at the price of the additional processing steps associated with the degenerate triangle which slows the graphics rendering process. Thus, the winding order of triangle strips is an important performance-related consideration in optimizing the formation of triangle strips for conversion. However, the price paid for processing a degenerate triangle is small compared to starting new triangle strips. Thus, degenerate triangle processing can be used to stitch together two otherwise incompatible triangle strips. This method can be used to stitch together two triangle patches to form a continuous strip of triangles.

Figure 9:
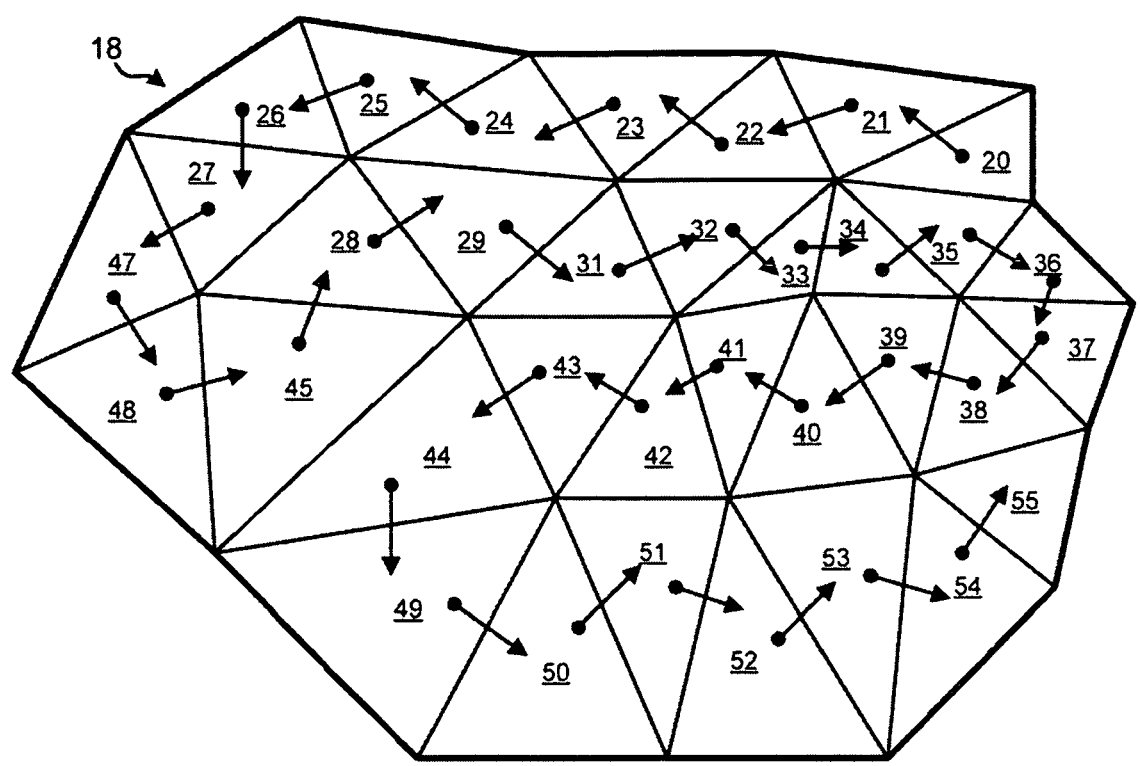
FIG. 9 is an illustration of the simple object of FIG. 3 illustrating an order for processing triangles.

Complex graphic objects, such as the model object 18 illustrated in FIG. 9, involve of a large number of triangles which must be converted into pixels. In order to efficiently process such large objects, the modeled triangles are preferably selected for conversion in an order which results in a minimum number of triangle strips. This is because the first triangle in any triangle strip requires processing of three vertices. Thus, minimizing the number of triangle strips used to convert a particular object also minimizes the number of vertices which must be converted and improves processing performance. This is illustrated in FIG. 9 which shows by the solid arrows one potential triangle strip proceeding from triangle 20 through to triangle 55.

As illustrated in FIG. 9, triangle strips can wander back and forth in order to encompass a contiguous patch of triangles. In so doing, it can be seen that several vertices are common to multiple triangles. For example, triangles 33, 34, 39, 40 and 41 share one vertex, so this common vertex need only be processed once if the triangles are processed in the order shown by the solid arrows. Thus, processing extended triangle strips within a patch of contiguous triangles can reduce the total number of vertices processed. By storing vertex conversion results in memory, such as a vertex cache memory, the processing results can be reused whenever a triangle strip returns to a previously processed vertex. When the triangle processing path returns to a vertex already processed, the previous results can simply be recalled from memory so than no vertices need to be converted to process the associated triangle.

Figure 10:
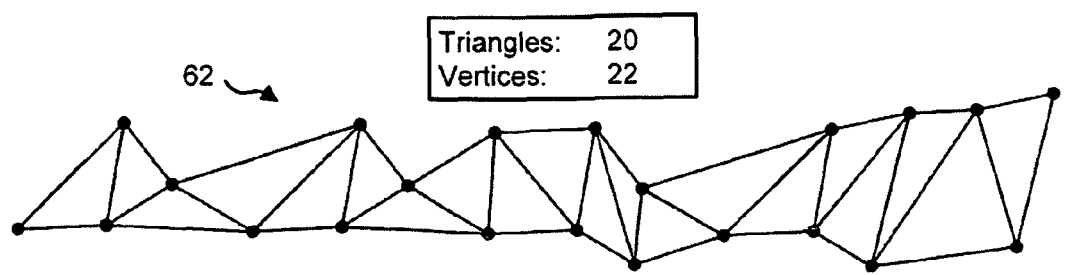
FIG. 10 is an illustration of a triangle strip for processing by a graphics pipeline.
Figure 11:
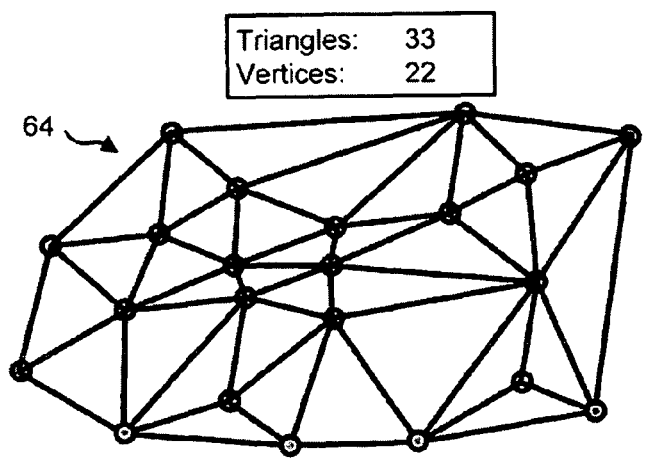
FIG. 11 is an illustration of a patch of contiguous triangles as may be formed using the various embodiments.

The processing advantages of forming triangle strips within contiguous patches is illustrated in FIGS. 10 and 11. FIG. 10 illustrates a well formed triangle strip encompassing 20 triangles. As discussed above, the processing of each triangle following the seed requires the conversion of only a single additional vertex. Thus, the processing of the 20 triangles illustrated in FIG. 10 requires the conversion of just 22 vertices. However, if the triangle strip is formed within a patch of contiguous triangles as illustrated in FIG. 11, several vertices can be used multiple times further reducing the number of vertices processed for an equal number of triangles. Thus, by selecting patches of contiguous triangles for processing and properly forming triangle strips within the patches, several triangles can be processed without requiring the conversion of any additional vertices. In the example triangle patch illustrated in FIG. 11, the same number of vertices (i.e., 22) are converted, but the total number of triangles processed is much larger (i.e., 33 versus 22). Since the processing of triangles is driven by the conversion of their vertices, organizing the processing of triangles as triangle strips within a contiguous patch enables a larger area to be processed within the same processing time. As the simple examples illustrated in FIGS. 10 and 11 reveal, this can result in significant savings in processing of modeled objects.

Figure 12:
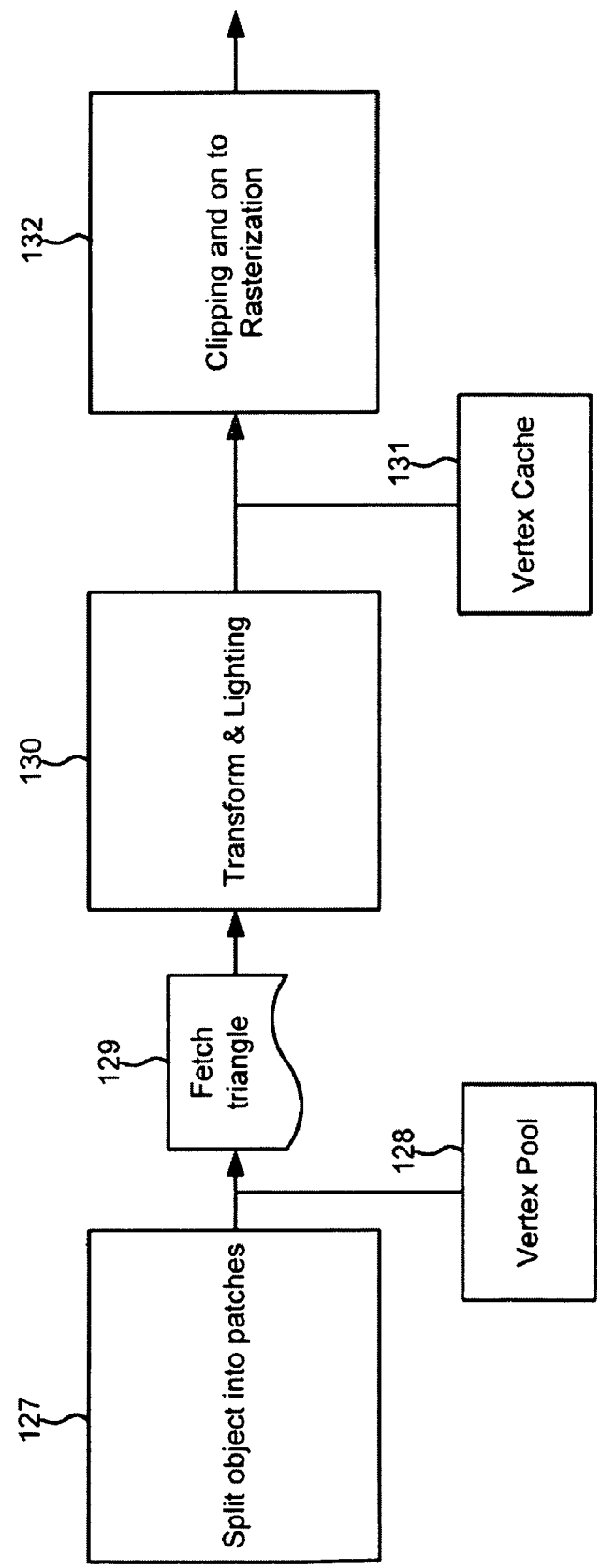
FIG. 12 is a block diagram of a portion of a graphics pipeline suitable for use with the various embodiments.

In order to enable efficient reuse of converted vertices, the graphics pipeline may be structured to include a vertex cache 131 as part of the graphics pipeline as illustrated in FIG. 12. The vertex cache 131 stores each converted vertex after the transformation circuit 130 prior to or in parallel with the results entering into the shader processing circuit 132. In this example architecture, triangles fetched from memory 129 are transformed in a transformation and lighting circuit 130. The 3-D transformation and lighting (or alternative vertex shader) processing converts each triangle vertex into a repositioned vertex in screen space in preparation for the rasterization stage. Processed information associated with each converted vertex is stored in the cache memory 131 before or in parallel with being sent to the shader circuit 132. Each converted vertex stored in the cache memory 127 can be accessed instead of performing a vertex transformation and conversion operation. In this way, vertex conversion results can be reused in the processing of triangle strips.

In order to assemble triangles into patches prior to being fetched, step 129, the various embodiments include a step of splitting the object into patches of contiguous triangles, step 127. To support this step, an index of vertices, referred to as a vertex pool 128, may be included in the architecture to store an index for each vertex added to a patch. This index list can be maintained by adding the indices to a sufficiently large index based vertex cache. While FIG. 12 illustrates the vertex pool 128 as a separate memory from the vertex cache 131, in some architectures the two may be combined into a single cache memory. For example, during the processing associated with splitting the object into patches, vertex positional coordinates may be added to the vertex cache 131, while other vertex coordinates are added after the transformation and lighting step 130.

The transformation and conversion of triangle vertices involves complex mathematical transformations applied to a large number of coordinates associated with each vertex. FIG. 13 illustrates some of the data associated with each vertex organized in a data structure that may be implemented for storing vertex conversion results within the vertex cache memory 127. In order to enable rapid recall of cached conversion results, each vertex may be indexed (i.e., identified in memory with a vertex index 150). Each vertex has associated with it positional coordinates x,y,z, as well as color coordinates in terms of red, green and blue values, for example. Additionally, the orientation of the surface of a triangle in a modeled object 18 can be defined by a set of normal vectors $n_x$, $n_y$, $n_z$. Using the minimum set of positional coordinates 152, color values 154 and surface normal vectors 156, an object may be modeled in three dimensions and presented with proper prospective as an image on a display screen. Further realism can be provided by applying textures, shading and other visual processing to the various vertices. For example, texture coordinates 158 may provide information regarding shading and texture to enable the graphics system to apply shading and texture results to each vertex or the associated pixels. Such coordinates may identify the location on a texture surface stored elsewhere in memory that should be applied to the vertex. Other graphic processing effects may be applied by including additional factors associated with each vertex, such as other 160 factors a, b, c.

During the process of generating patches of contiguous triangles, only the vertex coordinate may need to be cached. Thus, a vertex pool cache may include only the index 150 and x,y,z coordinates 152 shown within the dashed box in FIG. 13. In this process there are several data items to be tracked, including the triangle vertex count added, the indices added and which triangles have been consumed or added in the dilation process. The total vertex count added is the most space critical data. The indices added will only be fully determined after stripping, and until then the number equals 1 or three times the number of triangles depending on which way indices are counted.

The data structure illustrated in FIG. 13 shows that there is a significant amount of data associated with each vertex. For example, in a typical computer graphics application, the positional coordinate values x, y, z are each 32 bit data elements, color coordinates may be 16, 32 and 16.16 bit data, and surface normal coordinates are typically 32 bit data each. In mobile devices, like cellular telephones, some of the coordinates may be 16 bit data elements. Even in such reduced format implementations it is clear from the data structure illustrated in FIG. 13 that storing a large number of vertices in cache memory requires a significant size cache.

Figure 14:
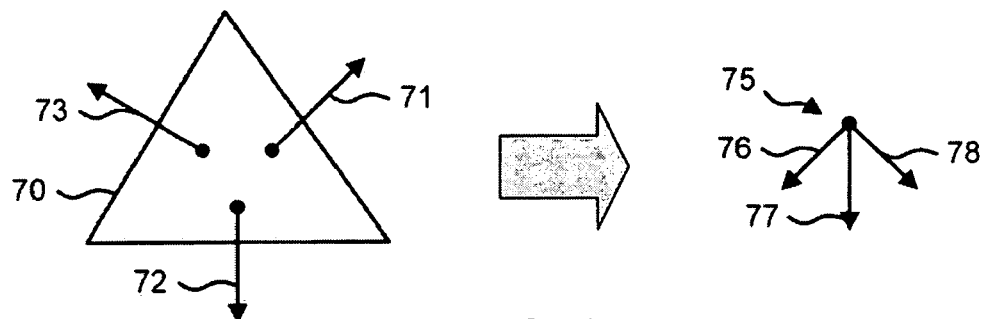
FIG. 14 is a diagram of a single triangle and the available paths that may be followed from that triangle.

As illustrated in FIG. 14, a first or "seed" triangle 70 considered in a mesh of triangles may lie adjacent to triangles on each of its three sides 71, 72, 73, thus presenting up to three possible directions in which to dilate the seed triangle to form a patch. These paths may be modeled as a simple traversal path tree with the seed triangle 70 forming a node 75 having optional dilation directions 76, 77, 78. Thus, the process of forming a triangle patch can be modeled as a series of traversal steps through a traversal path tree of contiguous triangles.

Figure 15:
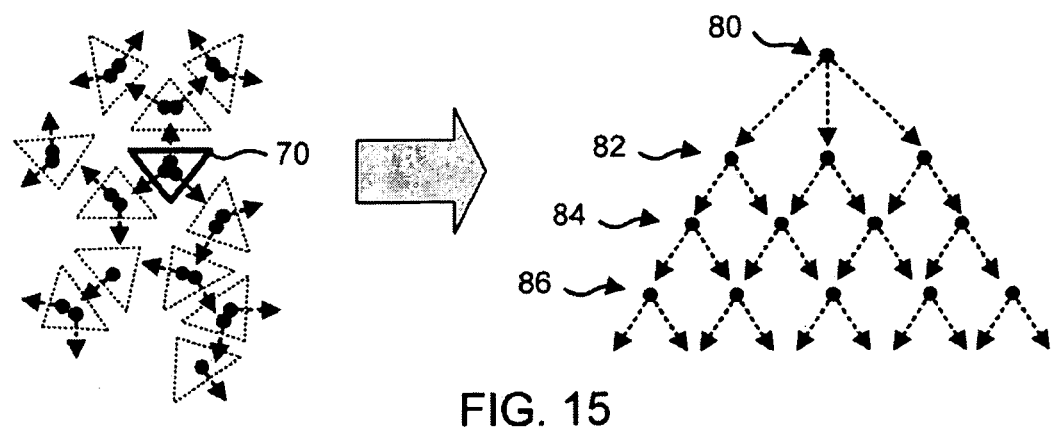
FIG. 15 illustrates a series of triangles with optional paths and how these paths can be structured as a tree of dilation traversal paths.

After the seed triangle 70, subsequent triangles have at most two adjacent triangles for further dilation of the patch as illustrated in FIG. 15. For example, the three triangles adjacent to a seed triangle 70 each have two adjacent triangles which can be added to the patch. This branching of adjacent triangles continues with each step in a dilation process until alternative dilation traversal paths collide or the triangles reach a boundary. This branching of a dilation paths from the seed triangle can be illustrated in a traversal path tree with a root node 80, and multiple traversal steps 82, 84, 86. The triangles at each traversal step 82, 84, 86 are at equal distance in terms of traversal steps from the seed triangle.

Figure 16:
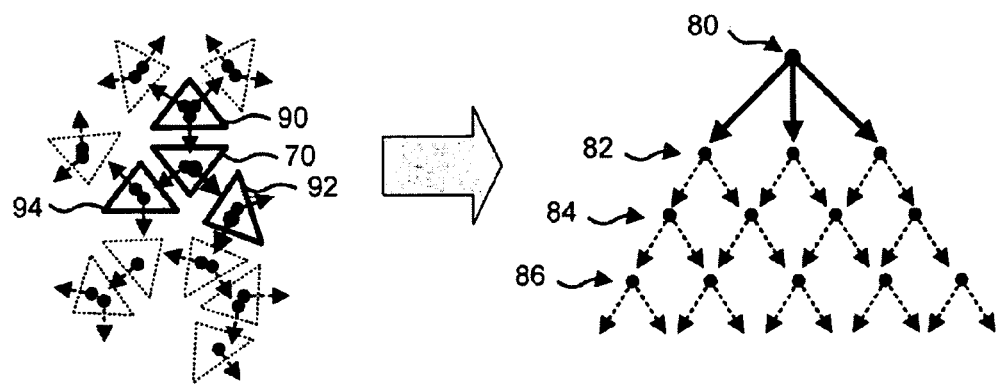
FIGS. 16-18 are illustrations of incremental dilation paths through the series of triangles illustrated in FIG. 15.
Figure 17:
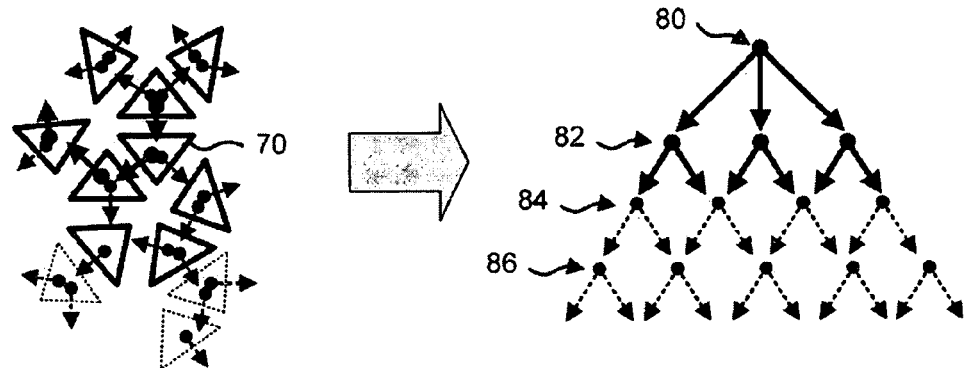
Figure 18:
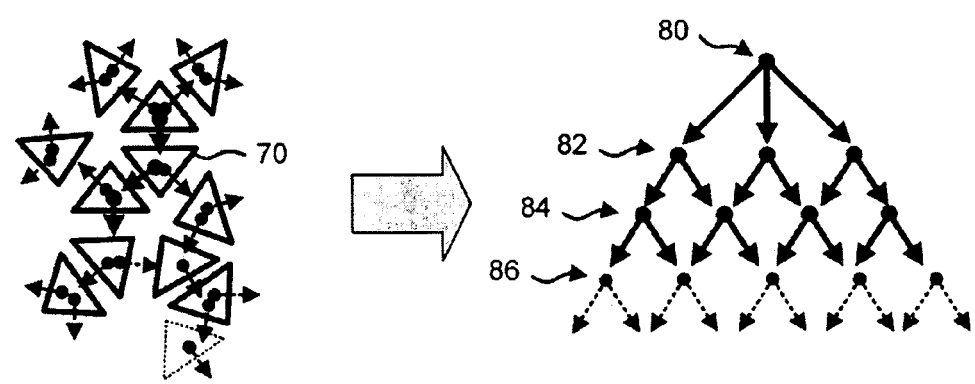

Simplistic illustrations of the formation of a triangle patch and its dilation traversal tree are provided in FIGS. 16 through 18. Referring to FIG. 16, starting with a seed triangle 70, the patch is formed by first adding the adjacent triangles 90, 92 and 94. Adding these three new triangles 90, 92, 94 to the patch adds three new vertices to the vertex pool. Thus, after one dilation step (also referred to herein as a traversal step) the vertex cache will contain six vertices (i.e., three from the seed triangle, and one new vertex from each of the three new triangles). This point is illustrated on the dilation traversal tree which has reached the first traversal depth 82.

FIGS. 17 and 18 illustrate the patch and the dilation traversal tree after two and three dilation steps, respectively. As these figures illustrate, dilating the patch in all directions from triangles on the edge of the path causes the patch to grow rapidly. Also, as the dilation traversal tree illustrates, the alternative paths from triangles also result in triangles that can be added to the patch along alternative traversal paths. This collision of traversal paths reduces the processing required in generating patches since vertices need to be added to the vertex pool just once in the patch generation process.

Figure 19:
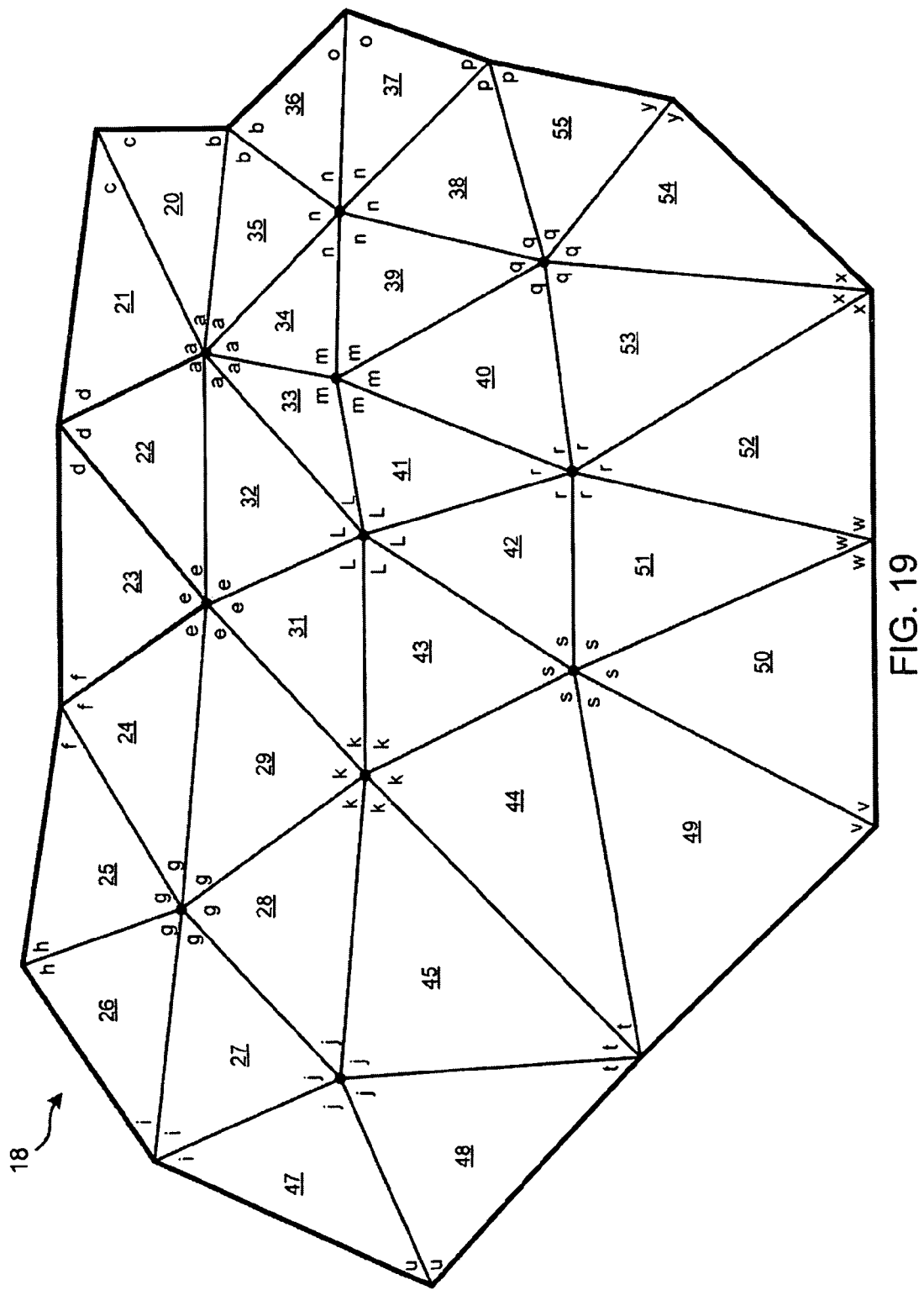
FIG. 19 is an illustration of the simple object shown in FIG. 4 with the triangle vertices identified.
Figure 20:
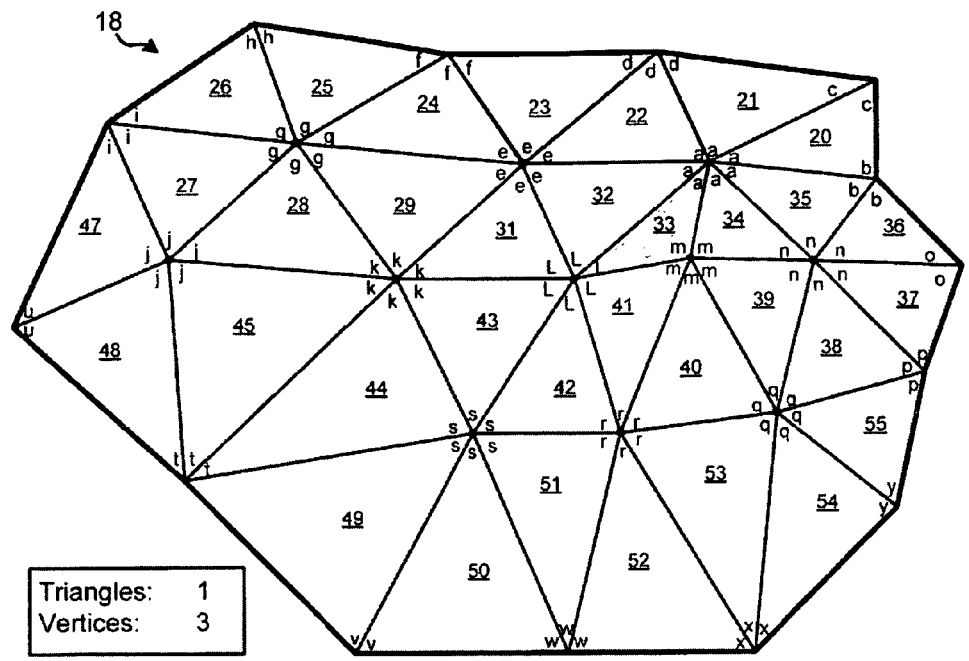
FIG. 20 is an illustration of the simple object with a seed triangle selected.
Figure 21:
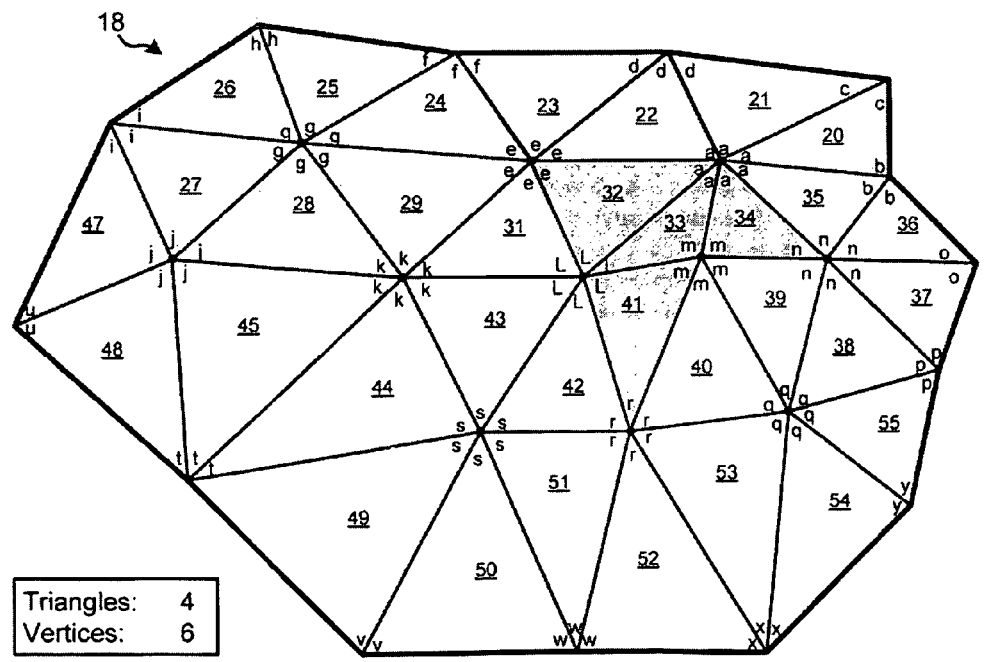
FIG. 21 is an illustration of the simple object with a patch formed by a traversal path of one dilation step from the seed triangle.

The generation of triangle patches is further illustrated in FIGS. 19-32. Referring to FIG. 19, the example modeled object includes 36 triangles 20-55 which encompass 23 vertices a-y. To begin the patch formation process, a seed triangle, in this example triangle 33, is selected, as illustrated in FIG. 20. Seed triangles may be selected based on heuristic criteria, such as minimum connectivity, and/or distance from edges in order to maximize the number of adjacent triangles for dilation. With just the seed triangle selected, one triangle 33 and three vertices a, m, L are included in the patch. From the seed triangle 33, each of the three adjacent triangles 32, 34, 41 are added to the patch in the next dilation step, as illustrated in FIG. 21. At this first step in the dilation process (i.e., a dilation traversal length of 1) the patch includes four triangles 32, 33, 34, 41 and six unique vertices a, e, L, m, n, r.

Figure 22:
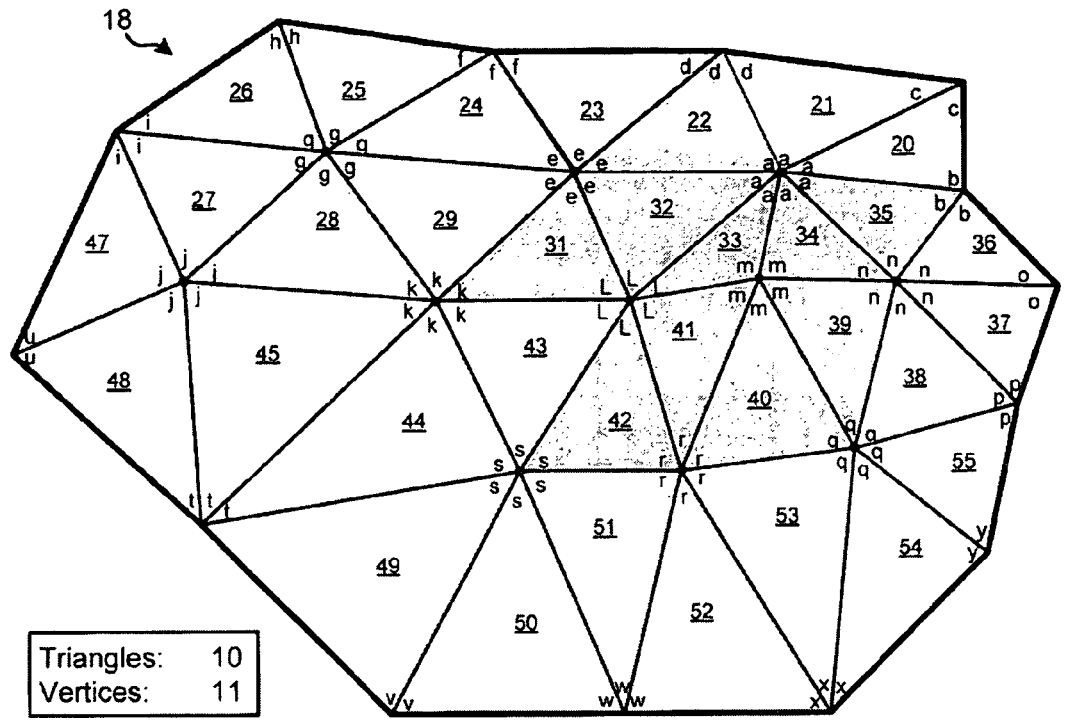
FIG. 22 is an illustration of the simple object with a patch formed by a traversal path of two dilation steps from the seed triangle.
Figure 23:
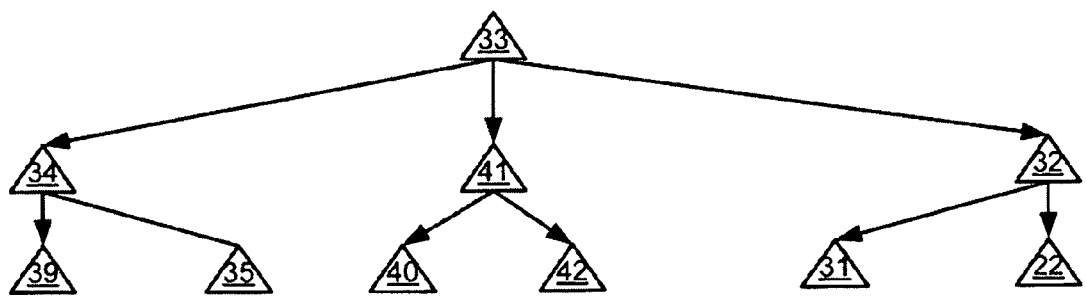
FIG. 23 is an illustration of the traversal paths followed from the seed triangle in forming the patch illustrated in FIG. 22.

FIG. 22 illustrates the state of the patch after another dilation step (i.e., a dilation length of 2). As can be seen in this figure, triangles 42 and 40 (adjacent to triangle 41), triangles 39 and 35 (adjacent to triangle 34) and triangles 22 and 31 (adjacent to triangle 32) have been added to the patch. This adds vertices b, d, e, k, s and q to the vertex pool. Thus, after two dilation steps, the patch includes 10 triangles and 11 vertices. The dilation traversal path is further illustrated in FIG. 23 which shows how the new triangles 22, 31, 35, 39, 40 and 42 are all two steps removed from the seed triangle 33.

Figure 24:
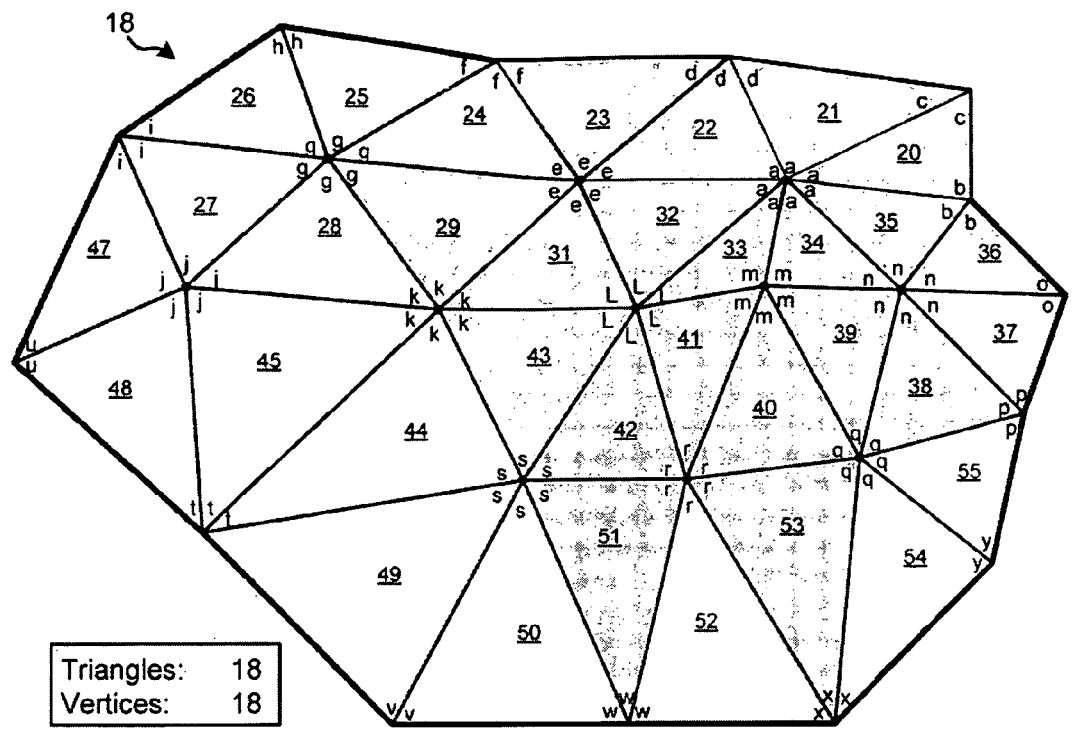
FIG. 24 is an illustration of the simple object with a patch formed by a traversal path of three dilation steps from the seed triangle.

FIG. 24 illustrates the evolution of the patch after a further dilation step (i.e., a dilation length of 3). As can be seen in this figure, triangles 21 and 23 (adjacent to triangle 22), triangles 29 and 43 (adjacent to triangle 31), triangle 51 (adjacent to triangle 42), triangle 53 (adjacent to triangle 40), triangle 38 (adjacent to triangle 39), triangles 20 and 36 (adjacent to triangle 35) have been added to the patch. This adds vertices c, f, g, w, x, p, and o to the vertex pool. Thus, after three dilation steps, the patch includes 18 triangles and 18 vertices. FIG. 24 also illustrates how triangle dilation paths tend to collide, so that some paths may result in only a single dilation path or may terminate before reaching a surface. For example, triangle 43 is at an equal traversal path length from the seed triangle 33 through both triangles 31 and 42. Thus, the dilation from these two triangles only added three new triangles 29, 43, 51. Similarly, triangle 39 was added in the previous dilation step (FIG. 22) from triangle 34, so the traversal path from triangle 40 to triangle 39 was not necessary in this dilation step.

Figure 25:
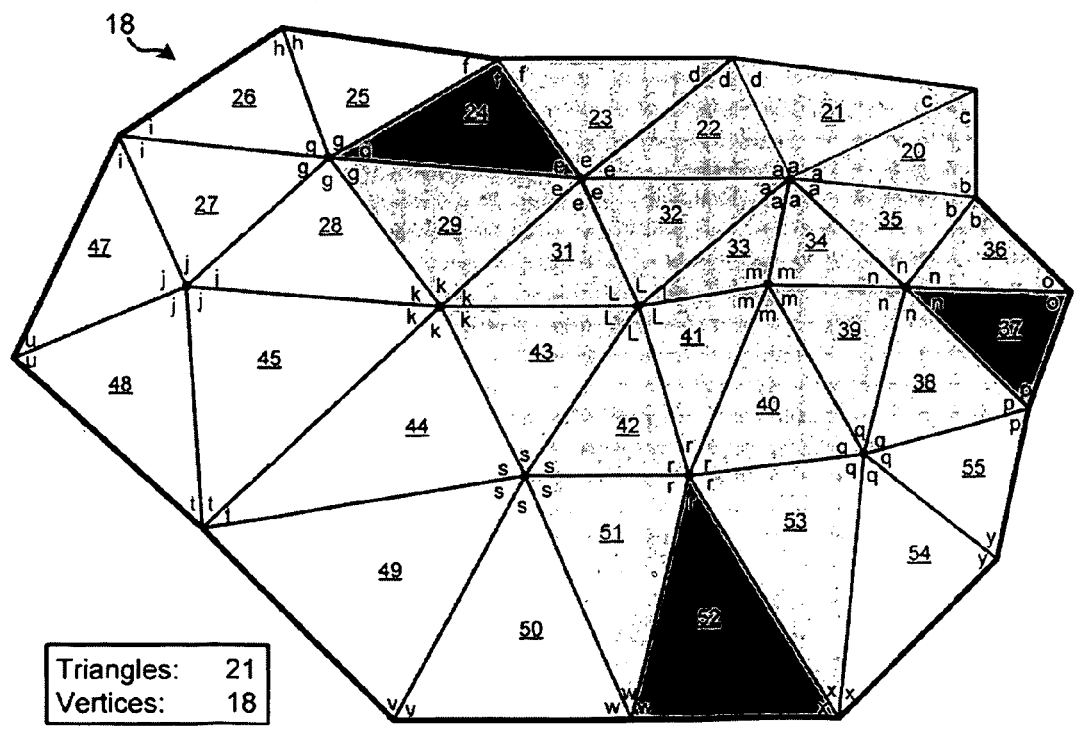
FIG. 25 is an illustration of the simple object with a patch formed by a traversal path of three dilation steps from the seed triangle including convex triangles.

FIG. 25, illustrates the process of convex triangle capture, which is the addition to the patch of triangles whose indices are encompassed within a patch when the vertex limit is reached. If the vertex cache limit were 18 vertices (admittedly a small cache), the patch generation process would stop dilation traversals. However, triangles 24, 37 and 52 are formed by vertices that have already been added to the vertex pool. Thus, these triangles, shaded in dark in FIG. 25, can be added to the finished patch "for free" since no additional vertex processing would be required. Thus, FIG. 25 illustrates the extent of the triangle patch if processing were stopped at 18 vertices and convex triangles are included in the patch. Result: a patch containing 21 triangles and 18 vertices.

Figure 26:
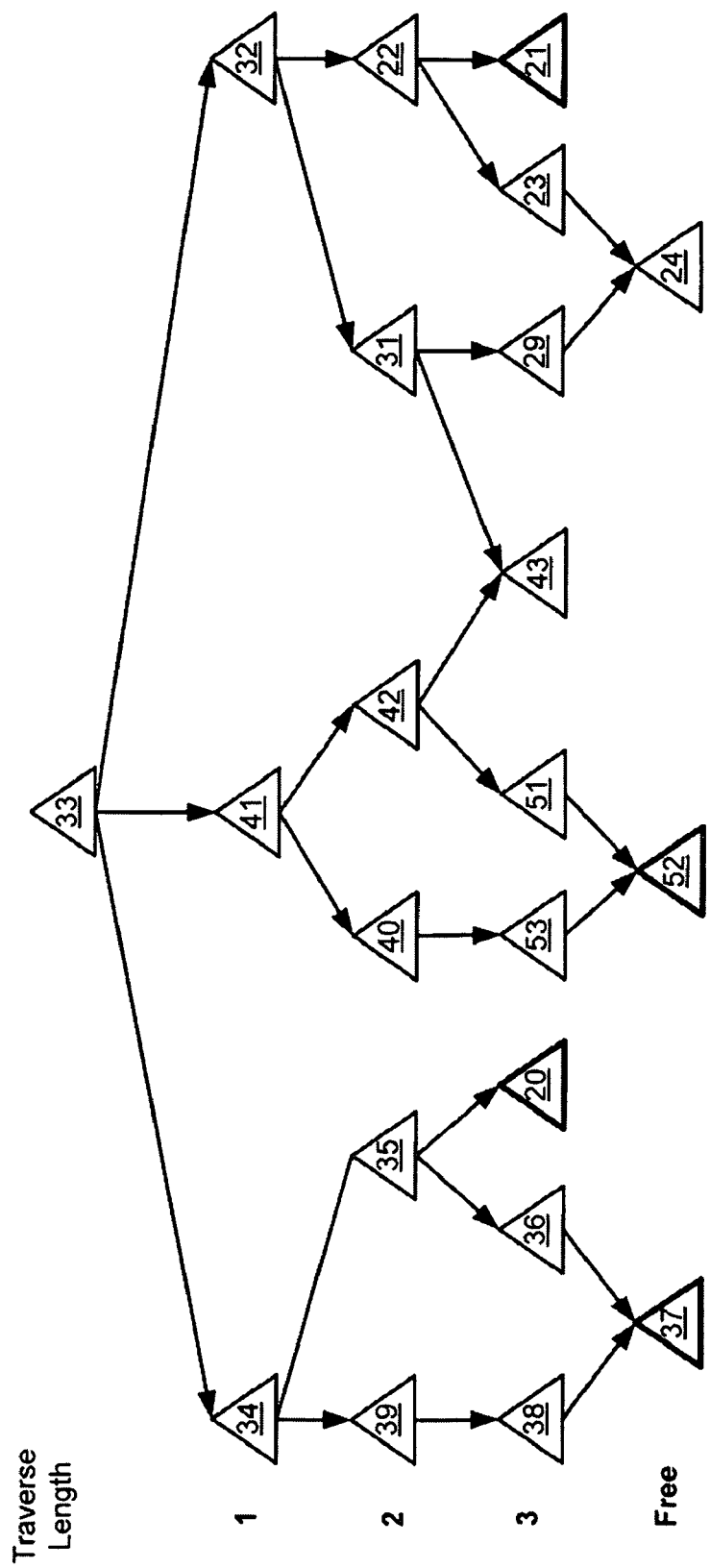
FIG. 26 is an illustration of the traversal paths followed from the seed triangle in forming the patch illustrated in FIG. 24.

FIG. 26 illustrates the dilation traversal path through three dilation steps. This figure shows how the new triangles 38, 36, 20, 53, 51, 43, 29, 23 and 21 are all three steps removed from the seed triangle 33. While triangles 37, 52 and 24 are four steps removed from the seed triangle, they do not add indices to the pool and so can be added to the patch without exceeding the vertex limit.

Figure 27:
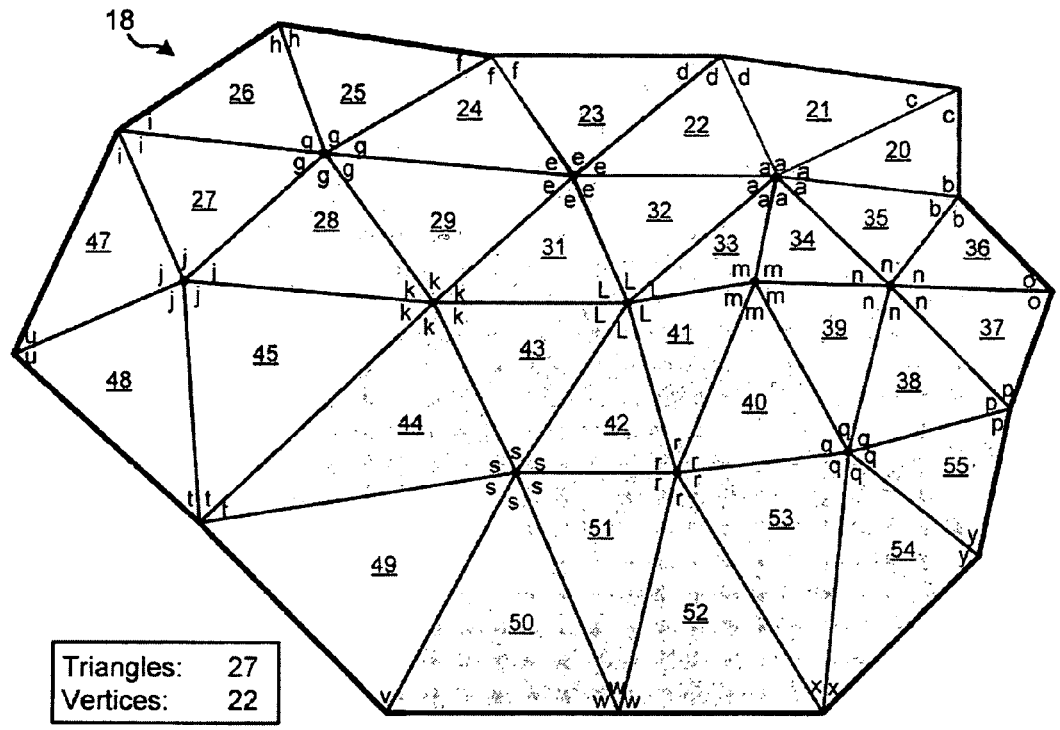
FIG. 27 is an illustration of the simple object with a patch formed by a traversal path of four dilation steps from the seed triangle.

FIG. 27 illustrates the evolution of the patch after another dilation step (i.e., a dilation length of 4). As can be seen in this figure, triangle 24 (adjacent to triangles 23 and 29), triangle 28 (adjacent to triangle 29), triangle 44 (adjacent to triangle 43), triangle 50 (adjacent to triangle 51), triangle 52 (adjacent to triangles 51 and 53), triangle 54 (adjacent to triangle 53), and triangles 37 and 55 (adjacent to triangle 38) have been added to the patch. This adds vertices j, t, v, and y to the vertex pool. Thus, after four dilation steps, the patch includes 27 triangles and 22 vertices. FIG. 24 also illustrates how triangle dilation paths may terminate when they reach triangles located on an edge of the object. For example, triangle 20 which was added new in the last step (FIG. 24) is adjacent to the edge and to triangle 21 which was added in the last step. Thus, no dilation from triangle 20 is possible. Similarly, triangle 36 has only one dilation traversal path available to triangle 37 which is at equal distance from the seed triangle 33 as through (i.e., it is in collision with) triangle 38.

Figure 28:
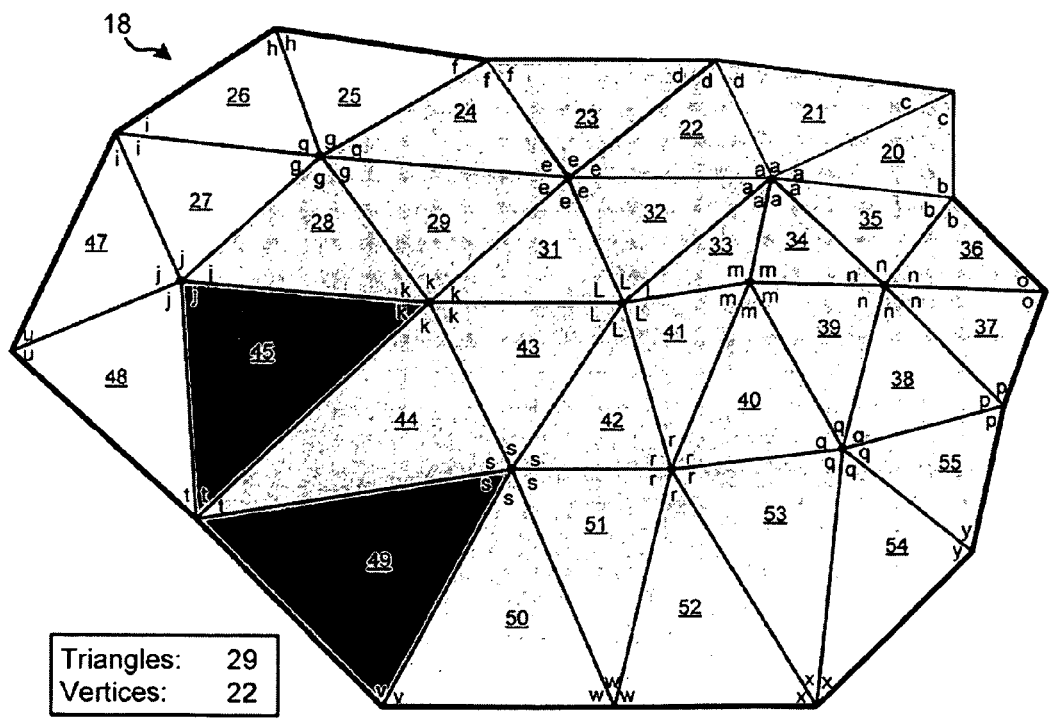
FIG. 28 is an illustration of the simple object with a patch formed by a traversal path of four dilation steps from the seed triangle including convex triangles.

FIG. 28, again illustrates the process of convex triangle capture which would be implemented if the vertex limit was reached at this point. If the vertex cache limit were 22 vertices, the patch generation process would stop dilation traversals. However, triangles 45 and 49 are formed by vertices that have already been added to the vertex pool. Thus, these triangles, shaded in dark in FIG. 28, can be added to the finished patch "for free" since no additional vertex processing would be required. Thus, FIG. 28 illustrates the extent of the triangle patch if processing were stopped at 22 vertices and convex triangles were captured, resulting in a patch containing 29 triangles.

Figure 29:
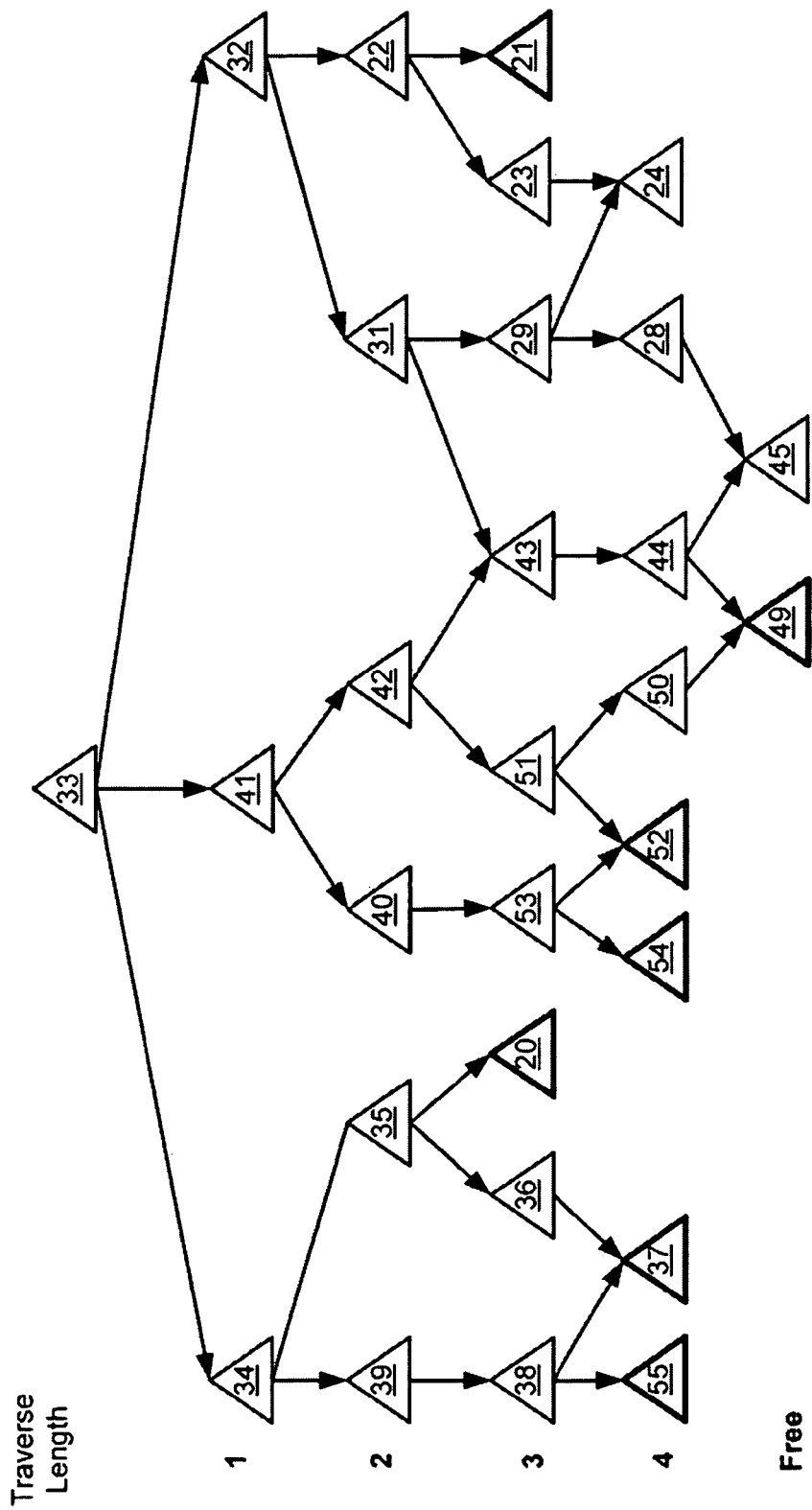
FIG. 29 is an illustration of the traversal paths followed from the seed triangle in forming the patch illustrated in FIG. 27.

FIG. 29 illustrates the dilation traversal path through four dilation steps. This figure shows how the new triangles 55, 37, 54, 52, 50, 44, 28, and 24 are all four steps removed from the seed triangle 33. While triangles 49 and 45 are five steps removed from the seed triangle, they do not add indices to the pool and so can be added to the patch without exceeding the vertex limit.

Figure 30:
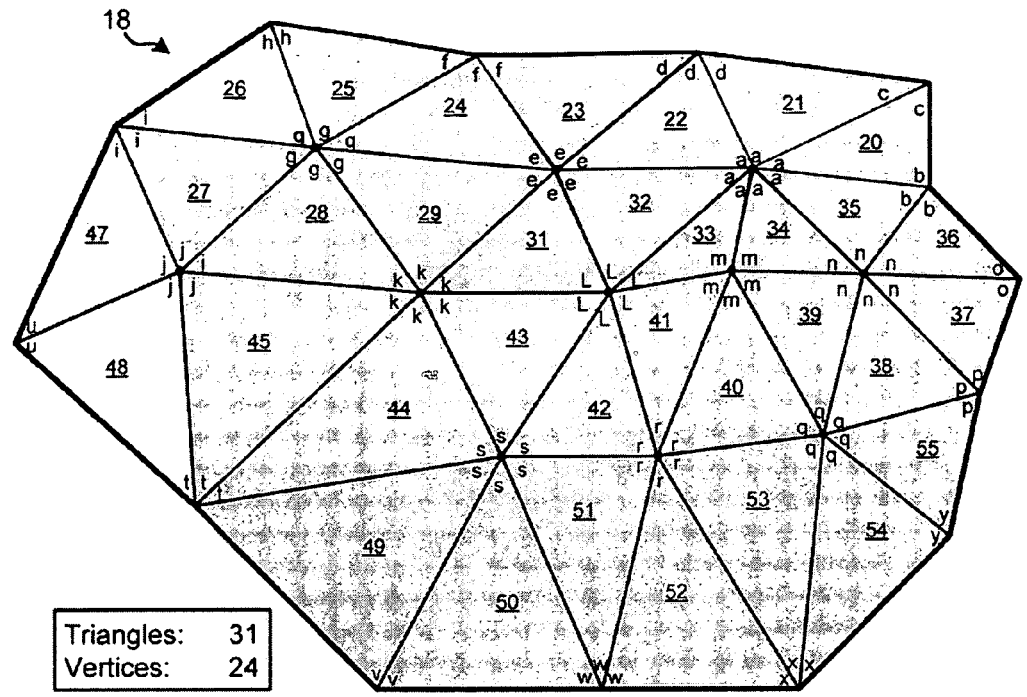
FIG. 30 is an illustration of the simple object with a patch formed by a traversal path of five dilation steps from the seed triangle.
Figure 31:
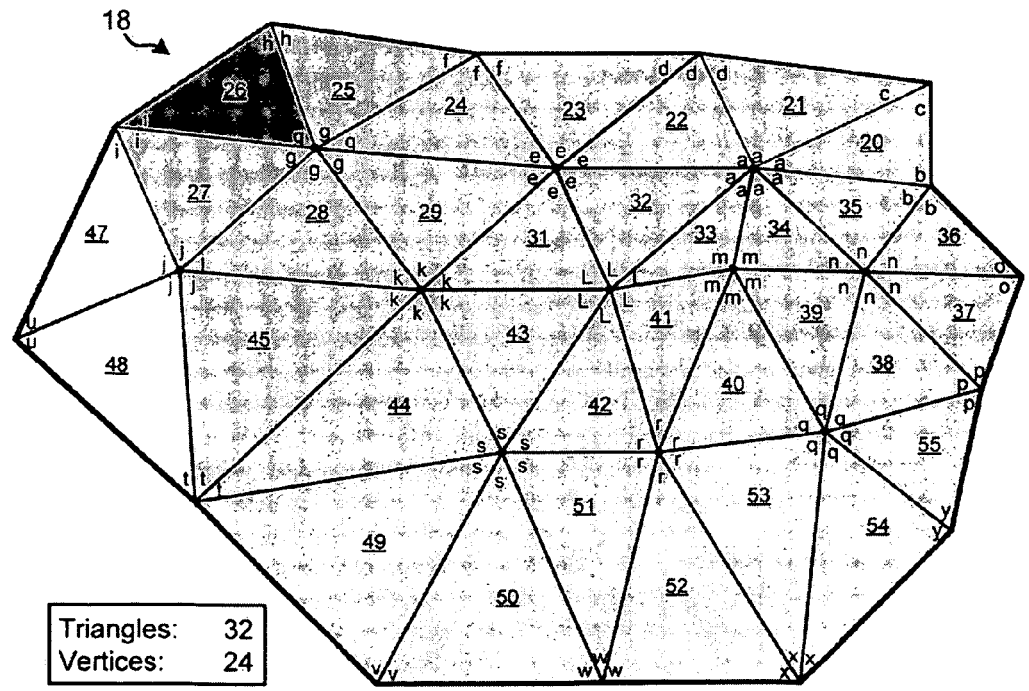
FIG. 31 is an illustration of the simple object with a patch formed by a traversal path of five dilation steps from the seed triangle including convex triangles.
Figure 32:
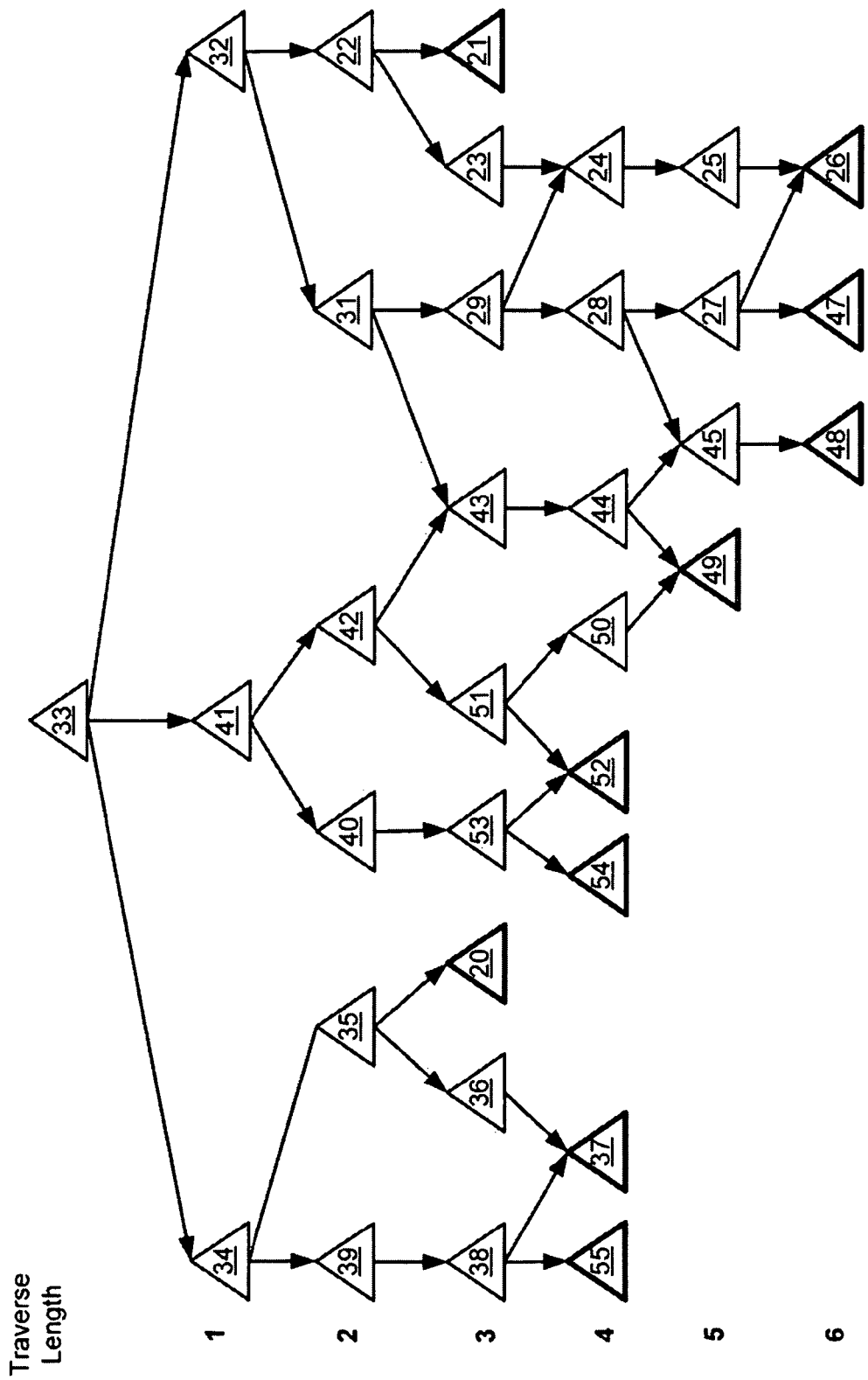
FIG. 32 is an illustration of the traversal paths followed from the seed triangle in forming the patch illustrated in FIG. 30.

In a similar manner, FIG. 30 illustrates the evolution of the patch after another dilation step (i.e., a dilation length of 4), while FIG. 31 illustrates the process of convex triangle capture which would be implemented if the vertex limit was reached at this point. As this figure illustrates, if the vertex limit were 24 and convex triangles are captured, the patch would include 32 triangles. FIG. 32 illustrates the dilation traversal path through six dilation steps which completes the patch encompassing the modeled object 18.

Figure 33:
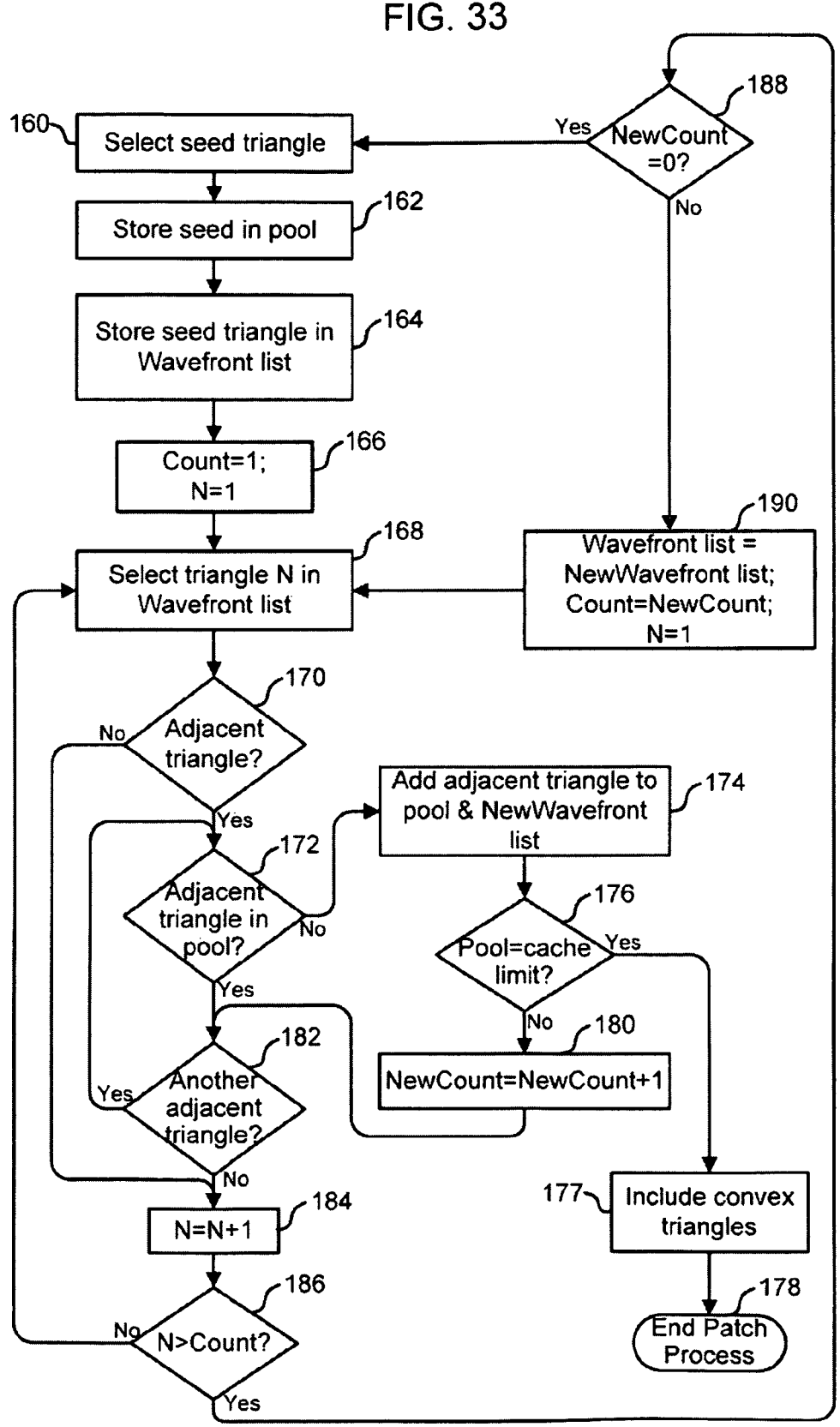
FIGS. 33 through 36 are process flow diagrams of method steps that may be implemented according to alternative embodiments.
Figure 34:
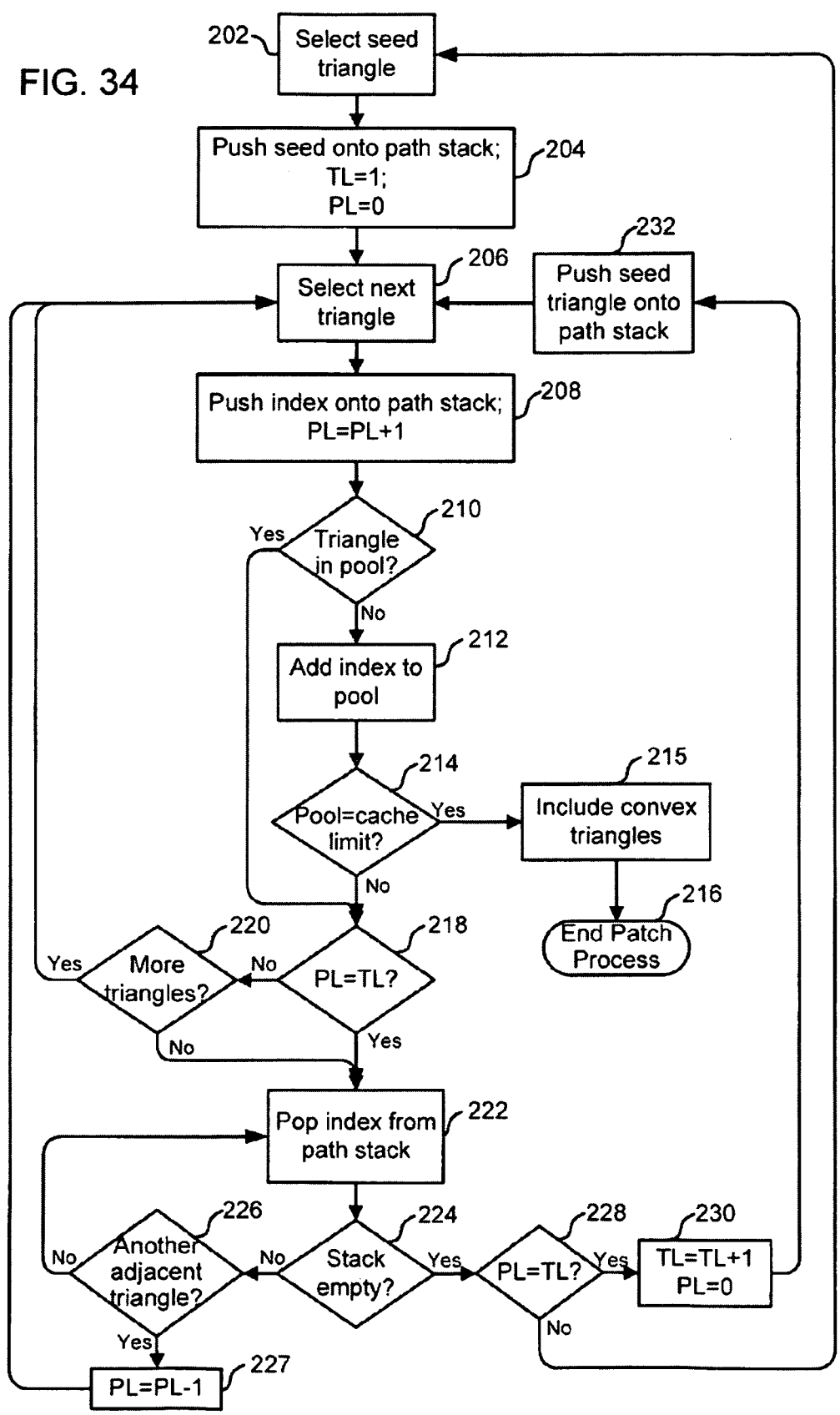

The patch generation methods of the various embodiments may be implemented in software and/or hardware using well-known recursive programming methods. Two example alternative embodiment methods for implementing the embodiments in software are illustrated in FIGS. 33 and 34. FIG. 33 illustrates a method in which the patch is extended one step at a time from an advancing front (referred to as a wave front). FIG. 34 illustrates a method in which paths are traversed recursively from the seed triangle.

In the wave front advancement embodiment method illustrated in FIG. 33, a seed triangle is selected within the triangle mesh of a modeled object, step 160. The seed triangle may be selected using heuristic criteria to increase the likelihood that a well formed patch can be generated. The vertices of the selected seed triangle may be stored in the vertex pool cache, step 162. Additionally, an identifier for the seed triangle is stored in a wave front triangle list, step 164. The wave front triangle list is a table in memory for storing identifiers of triangles on the periphery of a patch. To prepare for the first step in dilating the seed triangle into a patch of triangles, a variable "Count" (for example) is a set to 1 (corresponding to the first dilation step), and the wave front list counter "N" (for example) is initialized to 1, step 166. With these initial settings, the process proceeds in a recursive loop comprising steps 168 through 190 which progressively dilates the patch on the adjacent sides of triangles on the periphery of the patch. The periphery of the patch is made up of the triangles that were added in the last dilation step.

As a first step in the recursive loop, the process selects a particular triangle N stored in the wave front list, step 168. In the first pass through the recursive loop there is only one triangle stored in the wave front list, namely the seed triangle, so the first triangle selected is the seed triangle. The process determines whether there is a triangle adjacent to the selected triangle, test 170. If there is no adjacent triangle then the process skips down to step 184 described below since there is no need to evaluate triangles for addition to the patch. However, if there is an adjacent triangle, the process checks to determine whether the adjacent triangle has already been stored in the vertex pool (i.e., whether any one of the vertices is not already present in the vertex pool), test 172. If the triangle has not already been added to the pool, the adjacent triangle's new vertex (i.e., the vertex not already in the vertex pool) is added to the vertex pool and the triangle is added to a new wave front list, step 174. The new wave front list ("New-Wave front" in the figures) is a list of identifiers of the triangles added during a dilation step which will become the wave front list in the subsequent dilation step. The process may also checked to determine whether the size of the vertex pool equals the vertex cache limit, test 176. If adding the adjacent triangle to the vertex pool causes the vertex pool to equal the cache limit (i.e. test 176="Yes"), then the patch generation process has reached an end, so convex triangles (i.e., triangles adjacent to the patch whose vertices are already included within the vertex cache) are included in the patch, step 177, and the process terminates, step 178. However, if the cache limit has not been reached, a new counter value, such as "NewCount" as shown in FIG. 33, is incremented (i.e., the value is increased by one), step 180. This new counter value "NewCount" is the number of triangles that have been added to the vertex pool in the current pass through the recursive loop and thus the number of triangle identifiers stored in the new wave front list. This value will become the Count value in subsequent passes through the recursive loop.

After the adjacent triangle has been added to the vertex pool or if the adjacent triangle is already in the vertex pool (i.e., test 172="Yes"), the process may continue by testing whether there is another triangle adjacent to the selected triangle N, test 182. If there is another adjacent triangle, then the process repeats the previous steps testing whether the adjacent triangle is in the vertex pool, test 172, and adding it to the vertex pool if not, performing steps 174 through 180. Since the seed triangle may have three adjacent triangles (i.e., one on each of its three sides), test 182 may be positive two times, but the third time through the loop the result will be negative (i.e., test 182="No"). In subsequent dilation steps, the selected triangle will have a most two adjacent triangles to be evaluated. When all adjacent triangles have been tested or added to the vertex pool (i.e., test 182="No"), the triangle identifier N is incremented, step 184, in order to point to the next triangle in the wave front list. The incremented triangle identifier N is then compared to the Count value, test 186, to determine if all triangles in the wave front list have been evaluated. If the incremented value of N exceeds the Count, as it will in the first pass through the recursive loop because there is only one triangle in the wave front list (i.e., the seed triangle), the process will test the number of triangles listed in the new Count value to determine if it is equal to zero, test 188. As described more fully below, this test is used to detect when all possible triangles have been added to patch before the vertex cache limit has been reached. If the new count is greater than zero, indicating that at least one new triangle has been added to the patch in the previous dilation step, then the wave front list is replaced by the new wave front list (e.g., by copying the NewWave front list into the Wave front list), the Count value is set to the NewCount value and the triangle identifier N is reset to 1, step 190. The loop then continues in a recursive manner by selecting triangle N from the wave front list, repeating step 168.

In the second and subsequent passes through the recursive loop of steps 168 through 190, the Count (i.e., the number of triangles in the wave front list) may be greater than one, so that the incremented identifier N may be less than or equal to the Count in test 186 (i.e., test 186="No"). In that case, the loop returns to the step of selecting a triangle N from the wave front list, repeating step 168. As a result, the next triangle in the wave front list is selected for processing of steps 170 through 186 in the recursive loop.

The recursive loop of steps 168 through 190 will continue so long as the count of vertices in the vertex pool is less than the vertex cache limit (i.e., so long as test 176="No") or until the new Count value equals zero at test 188. If the new Count equals zero (i.e., test 188="Yes"), this indicates that no new triangles were added to the patch in the previous dilation step. This situation will occur if all triangles contiguous with the seed triangle have been added to the patch before the vertex cache limit has been reached. This may happen if the shape of the modeled object, the placement of the seed triangle and previously generated triangle patches result in triangle paths colliding together, reaching an edge of the object and/or colliding with previously generated patch. If this happens, a new seed triangle may be selected, repeating step 160, to continue developing an adjacent patch of triangles. The new seed triangle may be selected using heuristic criteria, such as selecting a triangle which is separate some distance from the current triangle patch in order to increase the probability that the new seed will lead to a well formed patch that will not immediately collide with the present patch.

Tests may be included in the process to detect when a modeled object has been completely processed (i.e., no more triangles remain to be added to a patch); such tests have been left out of FIG. 33 in order to simplify the description of the embodiment. The recursive loops in the embodiment method illustrated in FIG. 33 continue until all triangles have been encompassed within the vertex pool or the vertex cache limit is reached. If the patch terminates because the vertex cache limit is reached, convex triangles are captured since those additional triangles do not add to the vertex count. At this point, the patch of contiguous triangles has been generated and the patch can be used to generate triangle strips for conversion.

FIG. 34 illustrates an alternative embodiment method in which the triangle patch is generated using a recursive traversal of all alternative adjacent triangle paths down to an equal traversal depth, with the traversal depth being increased incrementally (i.e., with each dilation step). The example embodiment illustrated in FIG. 34 utilizes a stack memory (referred to as a "path stack" in FIG. 34) to facilitate moving through the triangle paths. The example embodiment also utilizes a traversal length ("TL") counter and a path length ("PL") counter to track progress through the triangle paths. However, a variety of different recursive traversal algorithms may be used, some of which may not involve the use of stack memories or variables similar to the TL and PL counters.

As a first step, a seed triangle is selected from within the triangle mesh of a modeled object, step 202. The seed triangle index or identifier is added to the path stack (i.e., as the first entry in the path stack), the TL counter is set to 1 (since the dilation of the seed triangle is the first dilation step), and the PL counter is set to zero, step 204. So initialized, the recursive loop comprising steps 206 through 230 can commence. This recursive loop successively follows all adjacent triangle paths from the seed triangle down to the traversal length (TL), which is then incremented before the loop is repeated until the cache limit is reached.

As a first step in the recursive loop, a triangle adjacent to the current triangle is selected, step 206. In this selection, an adjacent triangle that has not been evaluated in the current pass through the recursive loop is selected. Thus, in the first pass through the loop in the first traversal step, the process selects one of three (typically) adjacent triangles, while in the second pass through the loop in the same step the process selects one of two adjacent triangles and in the third pass through the loop the process selects the remaining adjacent triangle. The index or other identifier for this selected triangle is pushed onto the path stack and the path length counter PL is incremented, step 208. The process evaluates whether the selected triangle is already in the vertex pool (i.e., whether any one of the vertices is not already present in the vertex pool), test 210, and if not, the triangle's new vertex (i.e., the vertex not already in the vertex pool) is added to the vertex pool, step 212. The process may also test whether the size of the vertex pool equals the vertex cache limit, test 214. If adding the adjacent triangle to the vertex pool causes the vertex pool to equal the cache limit (i.e. test 214="Yes"), then the patch generation process has reached an end, so convex triangles (i.e., triangles adjacent to the patch whose vertices are already included within the vertex cache) are included in the patch, step 215, and the process terminates, step 216. If the cache limit has not been reached, the process tests whether the path length counter equals the traversal length counter (PL=TL), test 218. This test determines whether the traversal path has reached the end of the traversal distance for a particular dilation step. If it has (i.e. test 218="Yes") as it will in the first traversal step, the process moves back a step in the traversal path by removing the selected triangle index from the path stack, step 222, and determines whether all traversal paths have been evaluated by testing whether the path stack is empty, test 224. In the first pass through the recursive loop in the first traversal step the seed triangle has three alternative paths (one for each side), so the path stack will not be empty at this point (i.e. test 224="No"), so the process tests whether there is an another adjacent triangle (i.e., a triangle adjacent to the triangle identified by the index in the path stack), test 226. At this point in the first pass through the recursive loop in the first traversal step the seed triangle will have two (typically) more adjacent triangles (i.e. test 226="Yes"), so the path length counter PL is decremented to point back to the seed triangle, step 227, and the loop repeated by selecting the next adjacent triangle, returning to step 206. The loop of steps 206 through 226 is repeated one or two times until there are no more triangles adjacent to the seed triangle which have not been evaluated (i.e., until test 226="No"). At this point, the index or identifier for the seed triangle is removed from the path stack, step 222, leaving the stack empty, so the result of test 224 will be positive (i.e. test 224="Yes").

At this point the process may test whether the path length also equals the traversal length, test 228, which will detect whether all triangles that can be reached from the seed triangle have been processed before of the vertex cache limit has been reached. If the path length and the transaction length counters are equal (i.e. test 228="Yes"), this means that all traversal paths from the seed triangle have been evaluated to the traversal depth. To expand the patch one more dilation step, the traversal length counter TL is incremented and the path length counter PL reset to zero, step 230, and the seed triangle is pushed back onto the path stack, step 232, before the recursive loop is repeated by selecting the next triangle, repeating step 206 and subsequent steps as described above.

In the second and subsequent passes through the recursive loop (i.e., for dilation steps>1), the process follows adjacent triangle paths down to the traversal length TL. For example, in the first pass through the loop in the second dilation step, the first selected triangle will already be in the vertex pool (i.e. test 210="Yes") because it was added during the first dilation step described above. Therefore, the process can skip to testing whether it is the path length equals the traversal length, test 218. Since the traversal length equals two (because this is the second dilation step) and the path length equals one (because the process is evaluating the first triangle in the traversal path) test 218 is negative. With this result, the process then tests whether the selected triangle is adjacent to any further triangles (other than the previous triangle and the preceding triangle in the current path), test 220. If so, the process continues by selecting the next triangle from among the further adjacent triangles, repeating step 206 and subsequent steps as described above. Then when the process returns to test 218, the results of this test will be positive (i.e. test 218="Yes") since the traversal length equals two (because this is the second dilation step) and the path length equals two (because the process is evaluating the second triangle in the traversal path). Accordingly, the process continues to step 222 to remove the selected triangle from the path stack. At this point, the stack will not be empty (i.e. test 224="No") since it will hold both the seed triangle and the first selected triangle adjacent to the seed triangle. Accordingly, the process will then test whether there is another triangle adjacent to the selected triangle, test 226, and if so the path length counter will be decremented, step 227, and the other adjacent triangle will be selected by repeating step 206. In this pass through the recursive loop the other adjacent triangle will be added to the vertex pool (step 212). Again the path length will equal the traversal length at test 218 (i.e. test 218="Yes"), so the selected triangle index will be removed from the path stack step 222. Doing so, leaves the seed triangle and the first select triangle in the path stack, so the stack will not be empty when tested (i.e. test 224="No"). Therefore, the process moves to testing whether there is another adjacent triangle. In this case, there is no further triangle adjacent to the selected triangle (which is the first selected triangle adjacent to the seed triangle) (i.e. test 226="No"), so step 222 is repeated to remove the selected triangle from the path stack leaving the seed triangle in the stack. Again, the path stack well not be empty (i.e. test 224="No"), so the process tests whether there is another triangle adjacent to the seed triangle, test 226. In this case, the seed triangle has two other adjacent triangles to be evaluated in this pass through the recursive loop (i.e. test 226="Yes"), so the path length is decremented to point to the seed triangle, step 227, and the next adjacent triangle selected by repeating step 206.

In subsequent passes through the recursive loop, the process continues to expand the patch outward along adjacent triangle paths until the vertex cache limit is met (i.e. test 214="Yes"), at which point the process terminates, steps 215 and 216. However, if the process runs out of triangles for processing before the vertex cache limit is met, the path stack will be empty, test 224, but the path length will be less than the traversal length, test 228 (i.e. test two and 28="No"). In this situation, the process can select a new seed triangle, repeating step 202, in order to generate another patch of contiguous triangles. The process can then continue as described above until the cache limit is met.

An example of a recursive software routine which accomplishes the patched dilation process is listed in FIG. 40.

The foregoing embodiments may also be modified to select an alternative seed triangle if the initially selected seed triangle leads to a patch with fewer vertices than allowed by the vertex cache limit. This can be accomplished by selecting a different seed triangle and starting the dilation process over instead of selecting an additional seed triangle and generating a second dilation patch as described above. For example, referring to FIG. 35, the wave front embodiment method can be modified simply by adding an additional step of clearing the vertex pool, step 192, prior to selecting a seed triangle, step 160, following a pass through the recursive loop which did not add an additional triangle to the vertex pool (i.e. test 180="Yes"). The remaining steps in the method illustrated in FIG. 35 proceed as described above with reference to FIG. 33. Similarly, the recursive traversal path embodiment method may be modified simply by adding a similar step to clear the vertex pool, step 200, prior to selecting a seed triangle, step 202, as illustrated in FIG. 36. The remaining steps in the method illustrated in FIG. 36 proceed as described above with reference to FIG. 34. In these alternative embodiments, the process of generating a triangle patch will continue among a variety of different seed triangles until the vertex cache limit is met.

Figure 35:
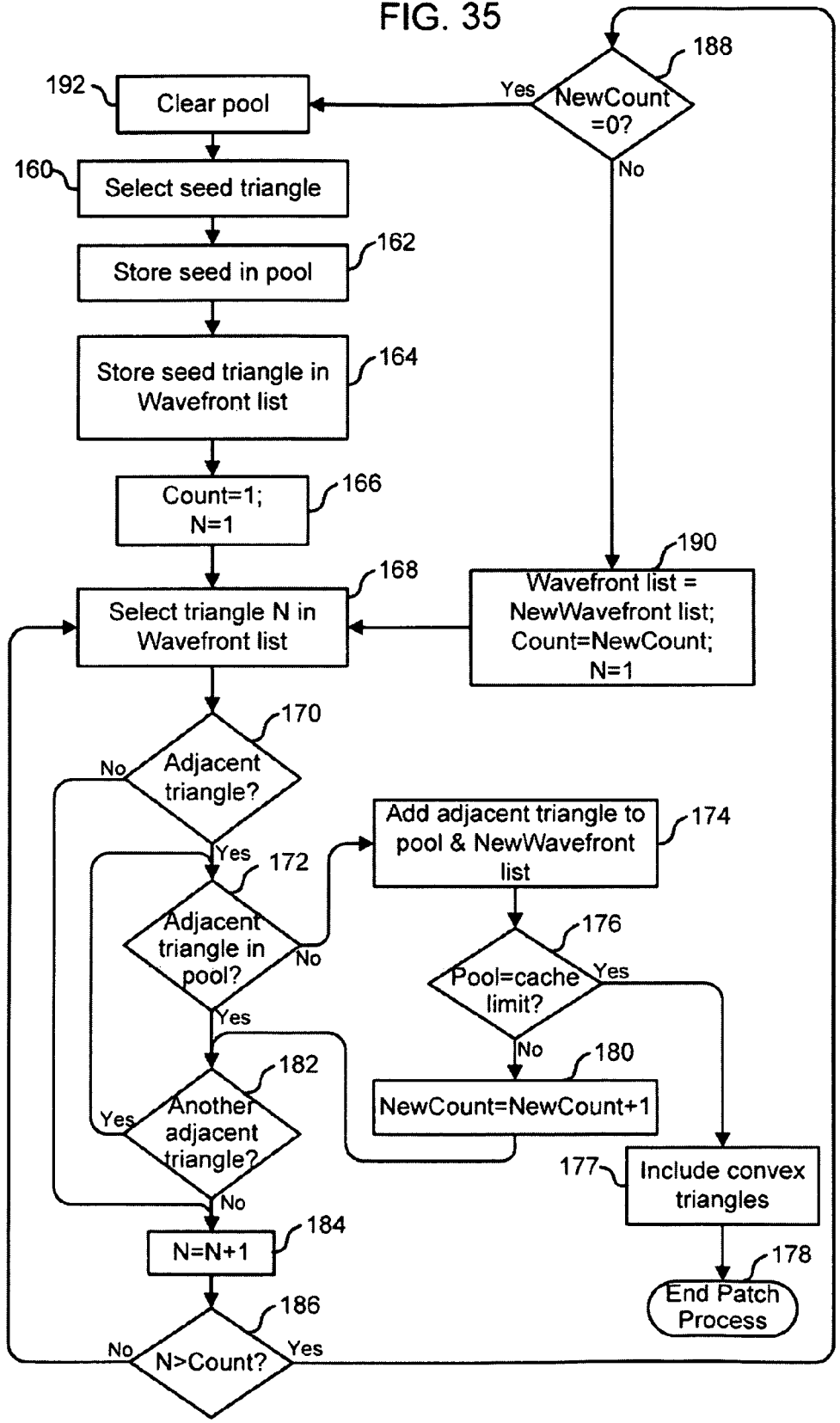
Figure 36:
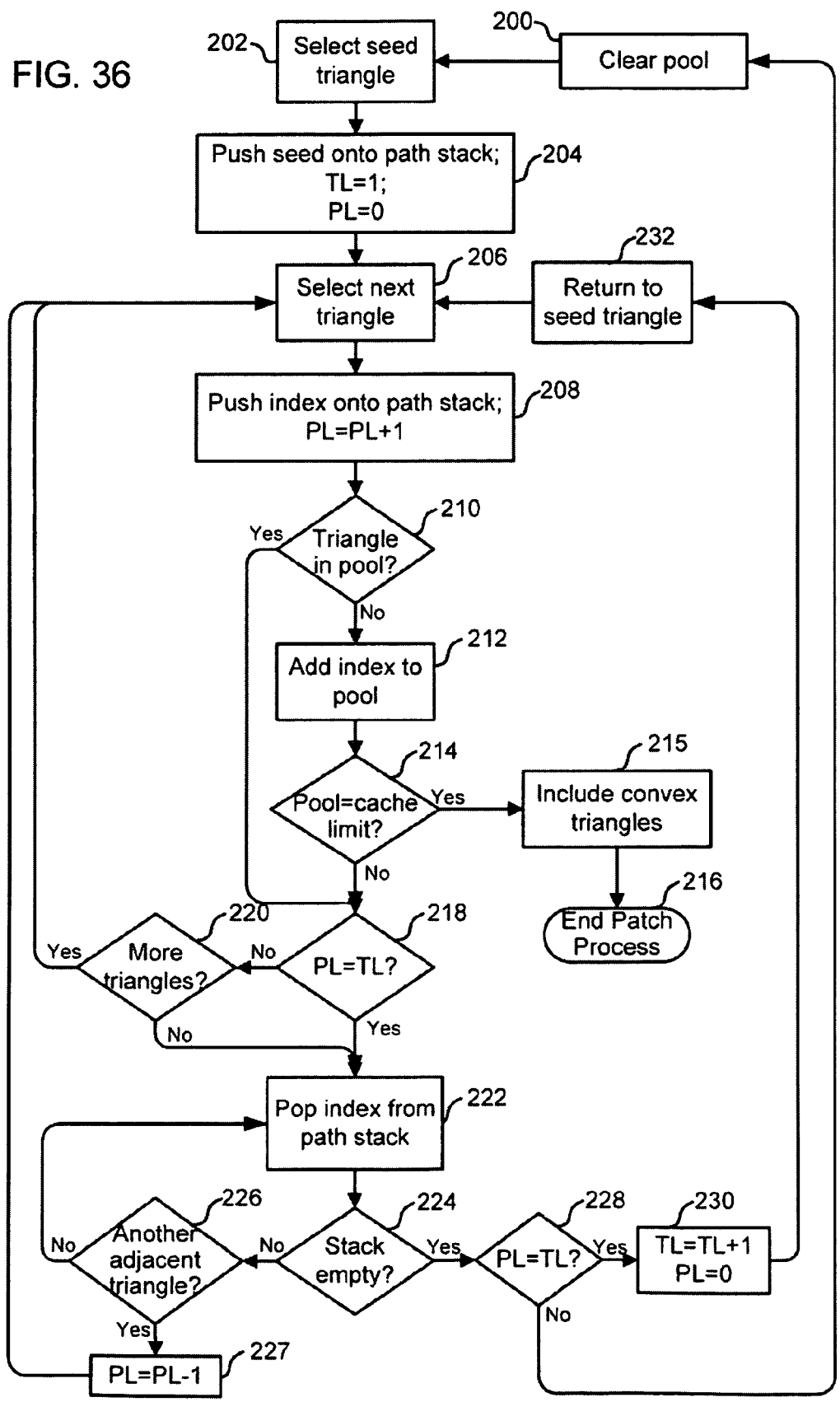

The foregoing embodiments may also be used to select an optimum seed triangle by repeating the processes illustrated in FIGS. 35 and 36 and keeping track of the results associated with each seed triangle selection. For example, if several seed triangles are selected and triangle patches generated using either of the processes illustrated in FIGS. 35 and 36 without the cache limit being met, the process may be modified to select the seed triangle which resulted in the largest vertex cache. Other criteria for evaluating alternative seed triangles may be used in selecting an optimum seed triangle, such as for example the ratio of triangles to vertices in the vertex cache. By adding additional evaluation steps to the process, other evaluation criteria may be used for determining an optimum seed triangle using these methods.

Figure 37:
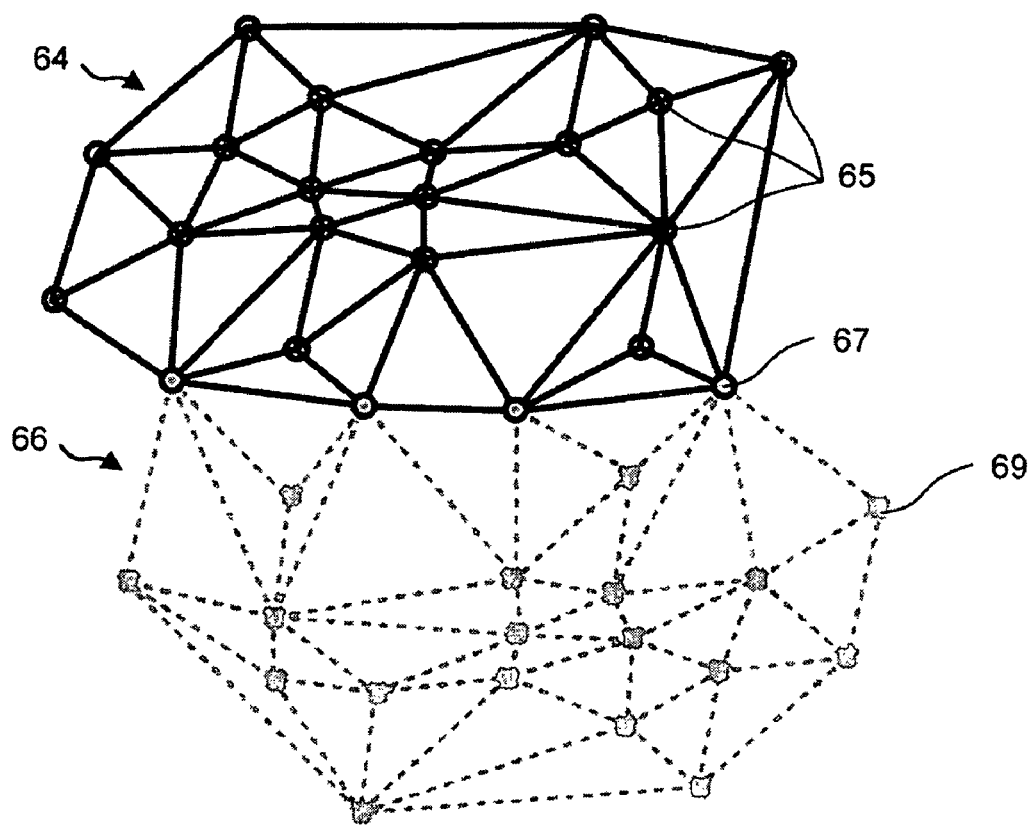
FIG. 37 is an illustration of two patches which may be processed together using degenerate triangle processing of intersecting vertices.

The embodiment methods may be used to generate multiple triangle patches within a modeled object each sized to the vertex cache limit. However, the advantages of forming patches of contiguous triangles extend to patches beyond the vertex cache limit. The well formed triangle strips that can be generated within a triangle patch can be extended into adjacent triangle patches in order to extend the efficiency benefits offered by processing triangle patches. For example, FIG. 37 illustrates two adjacent triangle patches 64, 66 which intersect at common vertices 67. By using degenerate triangle processing at the intersection of the two triangle patches 64, 66, the two patches can be stitched together so that triangle strips can flow between the triangle patches, enabling the patches to be combined into a single draw call by the graphics pipeline.

The embodiments described herein may be implemented on any of a variety of mobile devices. Typically, such mobile devices will have in common the components illustrated in FIG. 38. For example, the mobile device 240 may include a processor 241 coupled to internal memory 242 and a display 243. Additionally, the mobile device 240 will have an antenna 244 for sending and receiving electromagnetic radiation that is connected to a wireless data link and/or cellular telephone transceiver 245 coupled to the processor 241. In some implementations, the transceiver 245 and portions of the processor 241 and memory 242 used for cellular telephone communications are collectively referred to as the air interface since it provides a data interface via a wireless data link. Mobile device 240 also typically include a key pad 256 or miniature keyboard and menu selection buttons or rocker switches 247 for receiving user inputs. The mobile device 240 may also include connector plugs (not shown) for connecting data cables to the processor 241, such as a FireWire connector, or external memory devices, such as a USB memory device (not shown).

Figure 39:
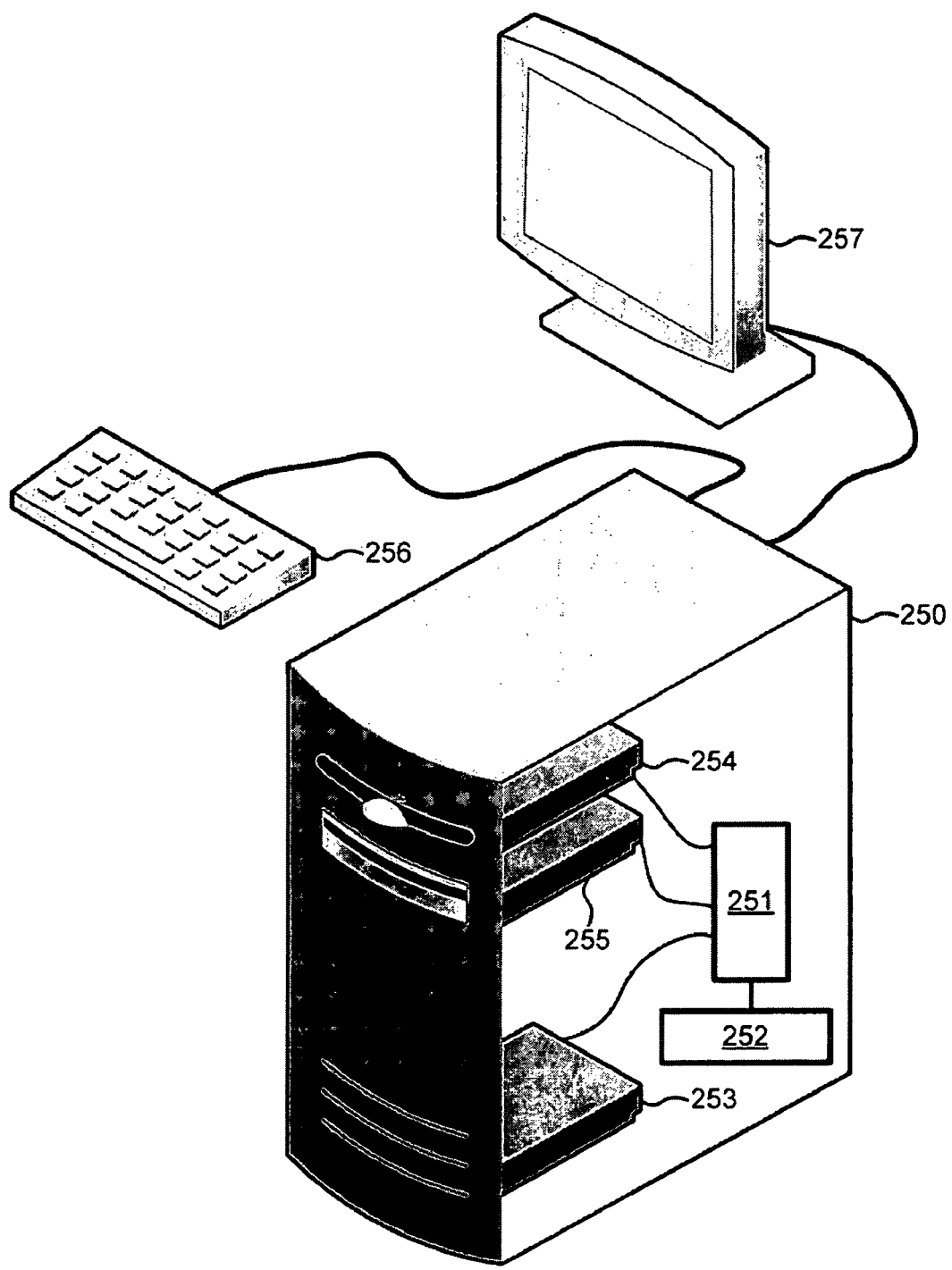
FIG. 39 is a component block diagram of a computer system suitable for use with the various embodiments.

The embodiments described above may also be implemented on any of a variety of computing devices, such as, for example a personal computer 250 illustrated in FIG. 39. Such a personal computer 250 typically includes a processor 251 coupled to volatile memory 252 and a large capacity nonvolatile memory, such as a disk drive 253. The computer 250 may also include a floppy disc drive 254 and a compact disc (CD) drive 255 coupled to the processor 251. Typically the computer 250 will also include a user input device like a keyboard 256 and a display 257. The computer 250 may also include a number of connector ports for receiving external memory devices coupled to the processor 251, such as a universal serial bus (USB) port (not shown), as well as network connection circuits (not shown) for coupling the processor 251 to a network.

The various embodiments may be implemented by a computer processor 251 executing software instructions configured to implement one or more of the described methods. Such software instructions may be stored in memory 252, 253 as separate applications, as part of the computer's operating system software, as a series of APIs implemented by the operating system, or as compiled software implementing an embodiment method. Further, the software instructions may be stored on any form of tangible processor-readable memory, including: a random access memory 252, hard disc memory 253, a floppy disc (readable in a floppy disc drive 254), a compact disc (readable in a CD drive 255), read only memory (such as an EEPROM), and/or a memory module (not shown) plugged into the computer 250, such as an external memory chip or a USB-connectable external memory (e.g., a "flash drive").

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A method for generating a patch of contiguous triangles for processing in a graphics processing engine, comprising:
a processor selecting a first seed triangle for the patch;
the processor recursively adding contiguous triangles to a first patch at equal path lengths from the first seed triangle until a count of triangle vertices in the first patch reaches a limit;
the processor including in the patch any triangles whose vertices are included in the patch; and
the processor selecting a second seed triangle and recursively adding contiguous triangles to a second patch at equal path lengths from the second seed triangle until a count of triangle vertices in the first and second patches reaches the limit if no more contiguous triangles can be added to the first patch and the count of triangle vertices in the first patch is less than the limit.

2. The method of claim 1, further comprising the processor forming a triangle strip within the first patch that is suitable for processing in a graphics pipeline.

3. The method of claim 1, wherein the step of recursively adding contiguous triangles to a first patch comprises:
the processor selecting a triangle from a list triangles added to the patch in a previous dilation step;
the processor adding any triangle adjacent to the selected triangle that is not already included in the patch; and
the processor storing an identifier of the added triangle in a list of triangles added in the current dilation step.

4. The method of claim 1, wherein the step of recursively adding contiguous triangles to a first patch comprises:
the processor following each traversal path through adjacent triangles from the first seed triangle to a traversal length;
the processor adding a triangle at the end of each traversal path to the patch if it is not already included in the path; and
the processor incrementing the traversal length once all traversal paths through adjacent triangles from the first seed triangle have been evaluated.

5. The method of claim 1, further comprising the processor indexing triangle vertices as each triangle is added to the patch.

6. A computer, comprising:
a processor; and
a memory coupled to the processor,
wherein the processor is configured with software instructions to perform steps comprising:
selecting a first seed triangle for forming a first patch of contiguous triangles;
recursively adding contiguous triangles to a first patch at equal path lengths from the first seed triangle until a count of triangle vertices in the first patch reaches a limit;
including in the patch any triangles whose vertices are included in the patch; and
selecting a second seed triangle and recursively adding contiguous triangles to a second patch at equal path lengths from the second seed triangle until a count of triangle vertices in the first and second patches reaches the limit if no more contiguous triangles can be added to the first patch and the count of triangle vertices in the first patch is less than the limit.

7. The computer of claim 6, wherein the processor is configured with software instructions to perform steps further comprising forming a triangle strip within the first patch that is suitable for processing in a graphics pipeline.

8. The computer of claim 6, wherein the processor is configured with software instructions to perform steps further comprising:
selecting a triangle from a list triangles added to the patch in a previous dilation step;
adding any triangle adjacent to the selected triangle that is not already included in the patch; and
storing an identifier of the added triangle in a list of triangles added in the current dilation step.

9. The computer of claim 6, wherein the processor is configured with software instructions to perform steps further comprising:
following each traversal path through adjacent triangles from the first seed triangle to a traversal length;
adding a triangle at the end of each traversal path to the patch if it is not already included in the path; and
incrementing the traversal length once all traversal paths through adjacent triangles from the first seed triangle have been evaluated.

10. The computer of claim 6, wherein the processor is configured with software instructions to perform steps further comprising indexing triangle vertices as each triangle is added to the patch.

11. A computer, comprising:
means for selecting a first seed triangle for forming a first patch of contiguous triangles;
means for recursively adding contiguous triangles to a first patch at equal path lengths from the first seed triangle until a count of triangle vertices in the first patch reaches a limit; and
means for including in the patch any triangles whose vertices are included in the patch; and
means for selecting a second seed triangle and recursively adding contiguous triangles to a second patch at equal path lengths from the second seed triangle until a count of triangle vertices in the first and second patches reaches the limit if no more contiguous triangles can be added to the first patch and the count of triangle vertices in the first patch is less than the limit.

12. The computer of claim 11, further comprising means for forming a triangle strip within the first patch that is suitable for processing in a graphics pipeline.

13. The computer of claim 11, further comprising:
means for selecting a triangle from a list triangles added to the patch in a previous dilation step;
means for adding any triangle adjacent to the selected triangle that is not already included in the patch; and
means for storing an identifier of the added triangle in a list of triangles added in the current dilation step.

14. The computer of claim 11, further comprising:
means for following each traversal path through adjacent triangles from the first seed triangle to a traversal length;
means for adding a triangle at the end of each traversal path to the patch if it is not already included in the path; and
means for incrementing the traversal length once all traversal paths through adjacent triangles from the first seed triangle have been evaluated.

15. The computer of claim 11, further comprising means for indexing triangle vertices as each triangle is added to the patch.

16. A non-transitory storage medium having stored thereon processor-executable software instructions configured to cause a processor of a computer to perform steps comprising:

selecting a first seed triangle for forming a first patch of contiguous triangles;

recursively adding contiguous triangles to a first patch at equal path lengths from the first seed triangle until a count of triangle vertices in the first patch reaches a limit;

including in the patch any triangles whose vertices are included in the patch; and selecting a second seed triangle and recursively adding contiguous triangles to a second patch at equal path lengths from the second seed triangle until a count of triangle vertices in the first and second patches reaches the limit if no more contiguous triangles can be added to the first patch and the count of triangle vertices in the first patch is less than the limit.

17. The non-transitory storage medium of claim 16, wherein the stored processor-executable software instructions are configured to cause a processor of a computer to perform further steps comprising forming a triangle strip within the first patch that is suitable for processing in a graphics pipeline.

18. The non-transitory storage medium of claim 16, wherein the stored processor-executable software instructions are configured to cause a processor of a computer to perform further steps comprising:

selecting a triangle from a list triangles added to the patch in a previous dilation step;

adding any triangle adjacent to the selected triangle that is not already included in the patch; and storing an identifier of the added triangle in a list of triangles added in the current dilation step.

19. The non-transitory storage medium of claim 16, wherein the stored processor-executable software instructions are configured to cause a processor of a computer to perform further steps comprising:

following each traversal path through adjacent triangles from the first seed triangle to a traversal length;

adding a triangle at the end of each traversal path to the patch if it is not already included in the path; and incrementing the traversal length once all traversal paths through adjacent triangles from the first seed triangle have been evaluated.

20. The non-transitory storage medium of claim 16, wherein the stored processor-executable software instructions are configured to cause a processor of a computer to perform further steps comprising indexing triangle vertices as each triangle is added to the patch.

* * * * *